United States Patent
Miyazaki et al.

(10) Patent No.: US 9,018,297 B2
(45) Date of Patent: Apr. 28, 2015

(54) RUBBER COMPOSITION FOR TREAD, AND PNEUMATIC TIRE

(71) Applicant: Sumitomo Rubber Industries, Ltd., Kobe-shi (JP)

(72) Inventors: Tatsuya Miyazaki, Kobe (JP); Masanobu Nakamura, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 14/073,921

(22) Filed: Nov. 7, 2013

(65) Prior Publication Data

US 2014/0128531 A1 May 8, 2014

(30) Foreign Application Priority Data

Nov. 8, 2012 (JP) .................................. 2012-246387
Nov. 8, 2012 (JP) .................................. 2012-246388

(51) Int. Cl.
| | | |
|---|---|---|
| C08K 3/30 | (2006.01) | |
| C08K 3/04 | (2006.01) | |
| C08K 5/20 | (2006.01) | |
| C08K 3/06 | (2006.01) | |
| B60C 1/00 | (2006.01) | |
| C08L 7/00 | (2006.01) | |
| C08L 9/00 | (2006.01) | |

(52) U.S. Cl.
CPC ... *C08K 5/20* (2013.01); *C08K 3/04* (2013.01); *C08K 3/06* (2013.01); *B60C 1/00* (2013.01); *C08L 7/00* (2013.01); *C08L 9/00* (2013.01); *B60C 1/0016* (2013.04); *B60C 1/0025* (2013.04); *B60C 2001/0066* (2013.04)

(58) Field of Classification Search
CPC .................................... C08K 5/20; C08K 3/06
USPC ........................................................ 524/418
See application file for complete search history.

(56) References Cited

U.S. PATENT DOCUMENTS

| | | | |
|---|---|---|---|
| 4,820,751 A | 4/1989 | Takeshita et al. | |
| 5,173,135 A | 12/1992 | Tokieda et al. | |
| 8,440,757 B2 * | 5/2013 | Kushida ........................ | 524/492 |
| 2006/0247342 A1 | 11/2006 | Da Silva et al. | |
| 2010/0256258 A1 | 10/2010 | Miyazaki | |
| 2010/0294407 A1 | 11/2010 | Kushida | |
| 2014/0020808 A1 | 1/2014 | Watanabe et al. | |

FOREIGN PATENT DOCUMENTS

| | | |
|---|---|---|
| EP | 0 080 451 A1 | 6/1983 |
| EP | 0 814 113 A2 | 12/1997 |
| EP | 0 814 113 A3 | 12/1997 |
| EP | 1 568 735 A1 | 8/2005 |
| EP | 1 726 615 A1 | 11/2006 |
| EP | 2 165 855 A1 | 3/2010 |
| JP | 64-020246 A | 1/1989 |
| JP | 02-202936 A | 8/1990 |
| JP | 2912845 B2 | 6/1999 |
| JP | 2001-114939 | 4/2001 |
| JP | 2002-284927 | 10/2002 |
| JP | 2005-271857 A | 10/2005 |
| JP | 2006-273934 A | 10/2006 |
| JP | 2006-328194 | 12/2006 |
| JP | 2007-197677 A | 8/2007 |
| JP | 2008-31427 A | 2/2008 |
| JP | 2008-156418 A | 7/2008 |
| JP | 2009-155394 A | 7/2009 |
| JP | 2010-184537 A | 8/2010 |
| JP | 2010-188955 A | 9/2010 |
| JP | 2011-252116 | 12/2011 |
| JP | 2012-87253 A | 5/2012 |
| JP | 2012-122015 | 6/2012 |

(Continued)

OTHER PUBLICATIONS

Yosuke Watanabe, et al., "Manufacture of rubber compositions for high fuel efficiency tires", Sumitomo Chemical Company, XP002718376, Nov. 2012, pp. 1-5.

(Continued)

*Primary Examiner* — Hui Chin

(74) *Attorney, Agent, or Firm* — Oblon, McClelland, Maier & Neustadt, L.L.P.

(57) ABSTRACT

The present invention provides a rubber composition for a tread which improves in terms of the fuel efficiency of a rubber composition containing an isoprene-based rubber and also offers favorable abrasion resistance and elongation at break, and a pneumatic tire comprising a tread formed from the rubber composition. The present invention relates to a rubber composition for a tread, comprising: a rubber component; a specific amount of a carbon black having a predetermined nitrogen adsorption specific surface area; a specific amount of sulfur; and a specific amount of a compound represented by formula (I) below, the rubber component comprising specific amounts of an isoprene-based rubber and a high-cis butadiene rubber having a predetermined cis content:

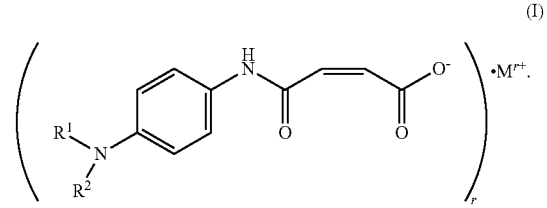

(I)

20 Claims, No Drawings

(56) References Cited

FOREIGN PATENT DOCUMENTS

| | | |
|---|---|---|
| JP | 2012-180386 A | 9/2012 |
| JP | 2014-84312 A | 5/2014 |
| WO | WO 2009/072560 A1 | 6/2009 |
| WO | WO 2012/147984 A1 | 11/2012 |

OTHER PUBLICATIONS

Geum Ju Jung, "Sidewall rubber composition and tire manufactured by using the same", Hankook Tire Co., Ltd., XP002718505, Jun. 2012, pp. 1-2.

"Rubber Composition for Base Tread and Pneumatic Tire" WPI/Thomson Scientific, XP002718377, 2004, 2 Pages.

* cited by examiner

RUBBER COMPOSITION FOR TREAD, AND PNEUMATIC TIRE

TECHNICAL FIELD

The present invention relates to a rubber composition for a tread, a sidewall, a wing, a base tread, a sidewall packing, a breaker cushion, or a tie gum, and also relates to a pneumatic tire that includes at least one selected from the group consisting of a tread, a sidewall, a wing, a base tread, a sidewall packing, a breaker cushion, and a tie gum, each of which is formed from the rubber composition.

BACKGROUND ART

In recent years, demand for fuel-efficient vehicles has increased, and with the increase thereof, rubber compositions for tires providing excellent fuel efficiency are desired. It is known that, in order to improve fuel efficiency, styrene-butadiene rubber or butadiene rubber is modified to promote dispersion of filler. For example, rubbers having a terminal modified with a nitrogen functional group-containing alkoxysilane are suggested as modified rubbers for silica formulation, and terminal-modified butadiene rubbers which are coupled with tin are, suggested as modified rubbers for carbon black formulation. In addition, mercapto group-containing silane coupling agents disclosed in Patent Literature 1 are known to have high reactivity with silica and promote dispersion of silica.

All the above techniques for improving fuel efficiency are effective for styrene-butadiene rubber or butadiene rubber, but are not sufficiently effective for isoprene-based rubbers such as natural rubber, highly purified natural rubber, isoprene rubber, and epoxidized natural rubber.

Rubber compositions for tires generally include isoprene-based rubbers in addition to styrene-butadiene rubber or butadiene rubber. In particular, rubber compositions used for heavy-load tires, which need to have high rubber strength, include isoprene-based rubbers as a main component. Therefore, there is a need for a technique for improving fuel efficiency which is effective for isoprene-based rubbers.

CITATION LIST

Patent Literature

Patent Literature 1: JP 2012-122015 A

SUMMARY OF INVENTION

Technical Problem

The present invention aims to solve the above problem to provide a rubber composition for a tread which improves in terms of the fuel efficiency of a rubber composition containing an isoprene-based rubber and also offers favorable abrasion resistance and elongation at break, and a pneumatic tire comprising a tread formed from the rubber composition.

The present invention further aims to solve the above problem to provide a rubber composition for a sidewall, a wing, a base tread, a sidewall packing, a breaker cushion, or a tie gum, which improves in terms of the fuel efficiency of a rubber composition containing an isoprene-based rubber and also offers favorable abrasion resistance, elongation at break, and processability, and a pneumatic tire comprising at least one selected from the group consisting of a sidewall, a wing, a base tread, a sidewall packing, a breaker cushion, and a tie gum, each of which is formed from the rubber composition.

Solution to Problem

A first aspect of the present invention relates to a rubber composition for a tread, comprising:

a rubber component;

a carbon black having a nitrogen adsorption specific surface area of 80 to 250 $m^2/g$;

sulfur; and a compound represented by formula (I) below, the rubber component comprising, based on 100 mass % of the rubber component, 35 to 95 mass % of an isoprene-based rubber and 5 to 65 mass % of a high-cis butadiene rubber having a cis content of 90 mass % or more, an amount of the carbon black being 20 to 70 parts by mass per 100 parts by mass of the rubber component, an amount of the sulfur being 0.5 to 1.6 parts by mass per 100 parts by mass of the rubber component, an amount of the compound represented by the formula (I) being 0.1 to 20 parts by mass per 100 parts by mass of the carbon black:

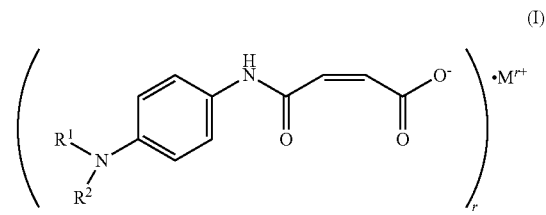

wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

The compound represented by the formula (I) is preferably a compound represented by the following formula (I-1), (I-2), or (I-3):

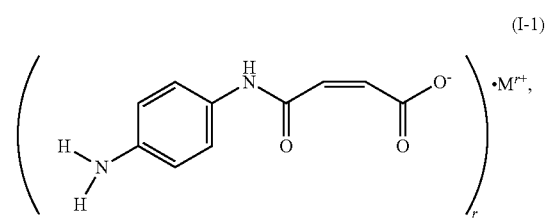

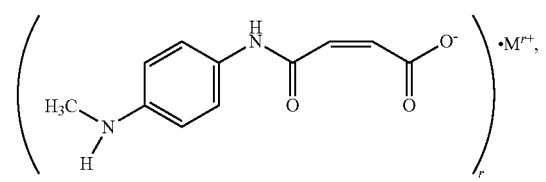

-continued

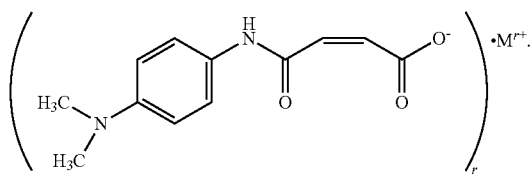
(I-3)

The metal ion is preferably a sodium ion, a potassium ion, or a lithium ion.

Preferably, the high-cis butadiene rubber is a rare earth butadiene rubber synthesized in the presence of a rare earth catalyst and having a vinyl content of 1.0 mass % or less and a cis content of 95 mass % or more, and the amount of the compound represented by the formula (I) is 0.5 to 5 parts by mass per 100 parts by mass of the carbon black.

The rubber composition preferably has a combined amount of stearic acid, calcium stearate, and fatty acid zinc salts of 3.5 to 6 parts by mass per 100 parts by mass of the rubber component.

The rubber composition preferably has an amount of oil of 7 parts by mass or less and an amount of zinc oxide of 1.5 to 3.99 parts by mass, each per 100 parts by mass of the rubber component.

The rubber composition preferably comprises a masterbatch obtained by kneading the isoprene-based rubber, the carbon black, and the compound represented by the formula (I), wherein the masterbatch comprises:

10 to 50 parts by mass of the carbon black per 100 parts by mass of the isoprene-based rubber, and 0.5 to 5 parts by mass of the compound represented by the formula (I) per 100 parts by mass of the carbon black.

The first aspect of the present invention also relates to a pneumatic tire, comprising a tread formed from the rubber composition.

A second aspect of the present invention relates to a rubber composition for a sidewall, a wing, a base tread, a sidewall packing, a breaker cushion, or a tie gum, the rubber composition comprising:

a rubber component;

a carbon black having a nitrogen adsorption specific surface area of 20 to 90 $m^2/g$;

sulfur; and a compound represented by the formula (I), the rubber component comprising, based on 100 mass % of the rubber component, 40 to 75 mass % of an isoprene-based rubber and 25 to 60 mass % of a butadiene rubber, an amount of the carbon black being 15 to 55 parts by mass per 100 parts by mass of the rubber component, an amount of the sulfur being 1.0 to 2.3 parts by mass per 100 parts by mass of the rubber component, an amount of the compound represented by the formula (I) being 0.1 to 20 parts by mass per 100 parts by mass of the carbon black.

The compound represented by the formula (I) is preferably a compound represented by the formula (I-1), (I-2), or (I-3).

The metal ion is preferably a sodium ion, a potassium ion, or a lithium ion.

The amount of the compound represented by the formula (I) is preferably 0.5 to 5 parts by mass per 100 parts by mass of the carbon black.

Preferably, the nitrogen adsorption specific surface area of the carbon black is 20 to 70 $m^2/g$, and the amount of the carbon black is 15 to 50 parts by mass per 100 parts by mass of the rubber component.

Preferably, the butadiene rubber is at least one selected from the group consisting of a syndiotactic crystal-containing butadiene rubber, a rare earth butadiene rubber synthesized in the presence of a rare earth catalyst, and a tin-modified butadiene rubber, and a combined amount of the syndiotactic crystal-containing butadiene rubber, the rare earth butadiene rubber, and the tin-modified butadiene rubber is 10 to 60 mass % based on 100 mass % of the rubber component.

The second aspect of the present invention also relates to a pneumatic tire, comprising at least one selected from the group consisting of a sidewall, a wing, a base tread, a sidewall packing, a breaker cushion, and a tie gum, each of which is formed from the rubber composition.

Advantageous Effects of Invention

The rubber composition for a tread of the first aspect of the present invention includes predetermined amounts of an isoprene-based rubber, a specific high-cis butadiene rubber, a specific carbon black, sulfur, and a compound represented by the formula (I). Therefore, the rubber composition can provide a pneumatic tire having fuel efficiency, abrasion resistance and elongation at break that are improved in a balanced manner.

The rubber composition for a sidewall, a wing, a base tread, a sidewall packing, a breaker cushion, or a tie gum of the second aspect of the present invention includes predetermined amounts of an isoprene-based rubber, butadiene rubber, a specific carbon black, sulfur, and a compound represented by the formula (I). Therefore, the rubber composition can provide a pneumatic tire having fuel efficiency, abrasion resistance, elongation at break and processability that are improved in a balanced manner.

DESCRIPTION OF EMBODIMENTS

First Aspect of the Present Invention

The rubber composition of the first aspect of the present invention contains an isoprene-based rubber, a specific high-cis butadiene rubber, a specific carbon black, sulfur, and a compound represented by the formula (I). The compound represented by the formula (I) binds to carbon black by a reaction of the nitrogen functional group at the terminal of the compound with a functional group, such as a carboxyl group, present at the surface of carbon black. Further, its carbon-carbon double bond site binds to polymers through a reaction with polymer radicals or a reaction involving sulfur crosslinking. As a result, the dispersibility of carbon black can be improved and this favorable dispersion state can be maintained during service. In addition, the polymers restrict the carbon black via the compound represented by the formula (I), resulting in a reduction in heat build-up. The rubber composition containing an isoprene-based rubber together with the compound represented by the formula (I), which provides these effects, as well as a specific high-cis butadiene rubber, a specific carbon black, and sulfur has improved fuel efficiency and further has favorable abrasion resistance and elongation at break.

The rubber component of the rubber composition of the first aspect of the present invention includes an isoprene-based rubber. The isoprene-based rubber generates a radical when its polymer chain is broken by kneading. The compound represented by the formula (I) captures the radical, so that the polymer chain binds to the compound represented by the formula (I).

Examples of the isoprene-based rubber include natural rubber (NR), isoprene rubber (IR), epoxidized natural rubber (ENR), and highly purified natural rubber (HPNR). NR can be suitably used.

The amount of the isoprene-based rubber based on 100 mass % of the rubber component is 35 mass % or more, preferably 55 mass % or more, and more preferably 75 mass % or more. If the amount is less than 35 mass %, the fuel efficiency may not be sufficiently improved. The amount of the isoprene-based rubber is 95 mass % or less, preferably 85 mass % or less. If the amount is more than 95 mass %, sufficient abrasion resistance may not be secured and therefore the fuel efficiency, abrasion resistance, and elongation at break may not be achieved in a balanced manner.

The rubber component of the rubber composition of the first aspect of the present invention includes a high-cis butadiene rubber (high-cis BR) having a cis content of 90 mass % or more. The high-cis BR is not particularly limited and may be one commonly used in the tire industry. The high-cis BR to be used may suitably be a rare earth butadiene rubber (rare earth BR) synthesized in the presence of a rare earth catalyst and having a vinyl content of 1.0 mass % or less (preferably 0.8 mass % or less) and a cis content of 95 mass % or more.

In the present invention, the values of the vinyl content (1,2-butadiene unit content) and the cis content (cis-1,4-butadiene unit content) are measured by infrared absorption spectrometry.

The amount of the high-cis BR based on 100 mass % of the rubber component is 5 mass % or more, preferably 15 mass % or more. If the amount is less than 5 mass %, sufficient abrasion resistance is not secured. The amount of the high-cis BR is 65 mass % or less, preferably 45 mass % or less, and more preferably 25 mass % or less. If the amount is more than 65 mass %, the fuel efficiency and elongation at break may not be sufficiently improved.

The rubber composition of the first aspect of the present invention contains a carbon black having a specific nitrogen adsorption specific surface area.

The nitrogen adsorption specific surface area ($N_2SA$) of the carbon black is 80 $m^2/g$ or more, preferably 100 $m^2/g$ or more. If the $N_2SA$ is less than 80 $m^2/g$, sufficient abrasion resistance and elongation at break may not be secured. The $N_2SA$ of the carbon black is 250 $m^2/g$ or less, preferably 180 $m^2/g$ or less, and more preferably 120 $m^2/g$ or less. If the $N_2SA$ is more than 250 $m^2/g$, the carbon black is less likely to be dispersed in the rubber composition and is also less likely to react with the compound represented by the formula (I), which may result in insufficient improvement of fuel efficiency.

The dibutyl phthalate (DBP) oil absorption of the carbon black is preferably 75 $cm^3/100$ g or more, and more preferably 100 $cm^3/100$ g or more. If the DBP oil absorption is less than 75 $cm^3/100$ g, sufficient abrasion resistance and elongation at break may not be secured. The DBP oil absorption of the carbon black is preferably 150 $cm^3/100$ g or less. If the DBP oil absorption is more than 150 $cm^3/100$ g, the dispersibility of carbon black, elongation at break, and processability may not be sufficiently secured.

The pH of the carbon black is preferably 7.9 or lower, more preferably 7.8 or lower, still more preferably 7.7 or lower, and particularly preferably 7.6 or lower. If the pH is more than 7.9, the reactivity (interaction) between the carbon black and the compound represented by the formula (I) may be reduced because the carbon black has a small amount of acidic functional groups, which may result in insufficient improvement of fuel efficiency. The pH of the carbon black is preferably 3.0 or higher, and more preferably 3.5 or higher. If the pH is lower than 3.0, the pH of the rubber composition tends to decrease to reduce the activity of vulcanizing agents, leading to reduced cross-linking efficiency.

The volatile content of the carbon black is preferably 0.8 mass % or more, more preferably 0.9 mass % or more, and still more preferably 1.0 mass % or more. If the volatile content is less than 0.8 mass %, the reactivity (interaction) between the carbon black and the compound represented by the formula (I) may be reduced, which may result in insufficient improvement of fuel efficiency and the like. The volatile content of the carbon black is preferably 3.5 mass % or less, and more preferably 3.0 mass % or less. If the volatile content is more than 3.5 mass %, in the vulcanization step, vulcanization needs to be continued until most of the volatiles are volatilized so that no porosities are formed. As a result, the vulcanization time tends to be prolonged, leading to poor productivity.

In the present specification, the DBP oil absorption, pH, and volatile content of carbon black are determined by the methods disclosed in JIS K6221 (1982), and the $N_2SA$ of carbon black is determined by the method disclosed in JIS K6217 (2001).

The amount of the carbon black per 100 parts by mass of the rubber component is 20 parts by mass or more, preferably 40 parts by mass or more. If the amount is less than 20 parts by mass, sufficient abrasion resistance and elongation at break may not be secured. The amount of the carbon black is 70 parts by mass or less, preferably 60 parts by mass or less. If the amount is more than 70 parts by mass, the heat build-up may increase and the abrasion resistance and elongation at break may end up being reduced.

The rubber composition of the first aspect of the present invention preferably includes carbon black (1) having an $N_2SA$ of 80 to 130 $m^2/g$ and carbon black (2) having an $N_2SA$ of 150 to 250 $m^2/g$ in combination as the carbon black. The amount of the carbon black (1) is preferably 1 to 20 parts by mass, and more preferably 5 to 15 parts by mass, per 100 parts by mass of the rubber component. The amount of the carbon black (2) is preferably 50 to 69 parts by mass, and more preferably 55 to 65 parts by mass, per 100 parts by mass of the rubber component.

The rubber composition of the first aspect of the present invention contains a compound represented by the following formula (I).

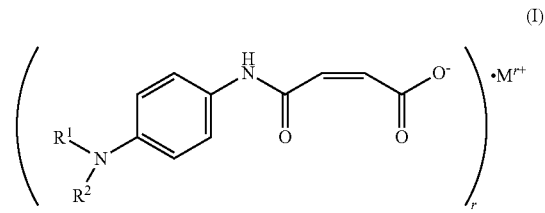

In the formula, $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

The alkyl group represented as $R^1$ or $R^2$ may be, for example, a methyl group, an ethyl group, an n-propyl group, an isopropyl group, an n-butyl group, a sec-butyl group, or a tert-butyl group.

The alkenyl group represented as $R^1$ or $R^2$ may be, for example, a vinyl group, an allyl group, a 1-propenyl group, or a 1-methylethenyl group.

The alkynyl group represented as $R^1$ or $R^2$ may be, for example, an ethynyl group or a propargyl group.

$R^1$ and $R^2$ are each preferably a hydrogen atom or an alkyl group, more preferably a hydrogen atom or a methyl group, and still more preferably a hydrogen atom. That is, the compound represented by the formula (I) is preferably a compound represented by the following formula (I-1), (I-2), or (I-3), and more preferably a compound represented by the formula (I-1).

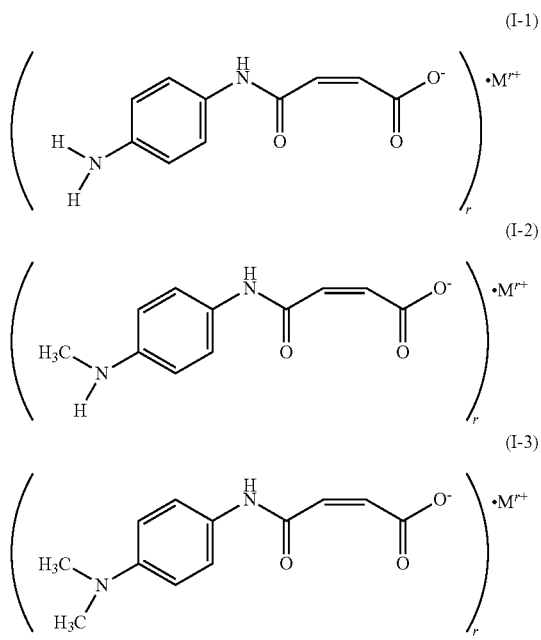

The metal ion in each of the formulas (I), (I-1), (I-2), and (I-3) may be a sodium ion, a potassium ion, or a lithium ion, and is preferably a sodium ion.

The amount of the compound represented by the formula (I) per 100 parts by mass of the carbon black is 0.1 parts by mass or more, preferably 0.5 parts by mass or more, and more preferably 1 part by mass or more. If the amount is less than 0.1 parts by mass, the fuel efficiency may not be sufficiently improved. The amount of the compound represented by the formula (I) is 20 parts by mass or less, preferably 10 parts by mass or less, and more preferably 5 parts by mass or less. If the amount is more than 20 parts by mass, sufficient abrasion resistance and elongation at break may not be secured.

The rubber composition of the first aspect of the present invention includes sulfur. The sulfur is not particularly limited and may be one commonly used in the tire industry.

The amount of sulfur per 100 parts by mass of the rubber component is 0.5 parts by mass or more. If the amount is less than 0.5 parts by mass, the rubber composition may not be sufficiently cured and thus fail to have the required hardness and tensile properties. The amount of sulfur is 1.6 parts by mass or less. If the amount is more than 1.6 parts by mass, the abrasion resistance may be reduced.

The amount of sulfur refers to the total sulfur content including sulfur derived from sulfur-containing coupling agents such as Vulcuren KA9188 produced by LANXESS and DURALINK HTS produced by Flexsys.

The rubber composition of the first aspect of the present invention preferably includes at least one selected from the group consisting of stearic acid, calcium stearate, and fatty acid zinc salts. The fatty acid zinc salt to be used may suitably be a saturated fatty acid zinc salt having 14 to 20 carbon atoms.

The combined amount of stearic acid, calcium stearate, and fatty acid zinc salts per 100 parts by mass of the rubber component is preferably 3.5 parts by mass or more. If the combined amount is less than 3.5 parts by mass, sufficient processability (Mooney viscosity, extrusion processability) may not be secured. The combined amount of stearic acid, calcium stearate, and fatty acid zinc salts is preferably 6 parts by mass or less. If the combined amount is more than 6 parts by mass, the abrasion resistance and elongation at break may be reduced.

The rubber composition of the first aspect of the present invention preferably includes zinc oxide. The zinc oxide is not particularly limited and may be one commonly used in the tire industry.

The amount of zinc oxide per 100 parts by mass of the rubber component is preferably 1.5 parts by mass or more. If the amount is less than 1.5 parts by mass, the fuel efficiency, elongation at break, and permanent set resistance may be reduced. The amount of zinc oxide is preferably 3.99 parts by mass or less, and more preferably 3 parts by mass or less. If the amount is more than 3.99 parts by mass, the abrasion resistance may be reduced.

In the rubber composition of the first aspect of the present invention, a compound represented by formula (II) below is preferably used as a crosslinking agent. In doing so, the rubber composition can contain a C—C bond with high binding energy and high thermal stability.

In the formula (II), A represents a C2-C10 alkylene group, and $R^{11}$ and $R^{12}$ are the same as or different from each other and each represent a monovalent organic group containing a nitrogen atom.

The alkylene group (C2-C10) represented as A is not particularly limited, and may be a linear, branched, or cyclic group. Linear alkylene groups are preferred, and a hexamethylene group is more preferred. $R^{11}$ and $R^{12}$ are not particularly limited as long as they are each a monovalent organic group containing a nitrogen atom. They each preferably include at least one aromatic ring, and more preferably include a linking group represented by N—C(=S)— in which a carbon atom is bound to a dithio group.

In cases where the rubber composition of the first aspect of the present invention includes the compound represented by the formula (II), the amount of the compound is preferably 0.5 to 5 parts by mass, and more preferably 1 to 3 parts by mass, per 100 parts by mass of the rubber component.

In addition to the above components, the rubber composition of the first aspect of the present invention may appropriately contain other additives usually used to prepare a rubber composition, such as reinforcing filler (e.g., silica), a silane coupling agent, an antioxidant, oil, wax, and a vulcanization accelerator.

The amount of oil per 100 parts by mass of the rubber component is preferably 7 parts by mass or less, more preferably 6 parts by mass or less, still more preferably 3 parts by mass or less, and particularly preferably 0.1 parts by mass or less. The amount may be 0 parts by mass. If the amount is more than 7 parts by mass, the reaction between the compound represented by the formula (I) and the functional group present at the surface of the carbon black may be inhibited.

The rubber composition of the first aspect of the present invention may be prepared by any known method, for example, by kneading the components using a known mixer such as a roll mill and a Banbury mixer.

The rubber composition of the first aspect of the present invention preferably includes a masterbatch obtained by kneading the isoprene-based rubber, the carbon black having a nitrogen adsorption specific surface area of 80 to 250 m$^2$/g, and the compound represented by the formula (I). That is, the rubber composition of the present invention is preferably prepared by kneading the isoprene-based rubber, the carbon black, and the compound represented by the formula (I) to prepare a masterbatch, and then kneading the masterbatch together with other additives. By previously kneading the isoprene-based rubber, the carbon black, and the compound represented by the formula (I), a coupling reaction via the compound represented by the formula (I) is allowed to efficiently proceed.

In cases where the rubber composition of the first aspect of the present invention includes carbon black (1) having an N$_2$SA of 80 to 130 m$^2$/g and carbon black (2) having an N$_2$SA of 150 to 250 m$^2$/g in combination, the carbon black (2) is preferably used in the step of preparing the masterbatch. In doing so, the carbon black (2) can be efficiently dispersed despite its fine particulate form and low dispersibility. In this case, the carbon black (1) is preferably kneaded with the masterbatch together with other additives in a subsequent step.

If a rubber other than the isoprene-based rubber, oil, a processing aid, stearic acid, or an antioxidant is kneaded in the step of preparing the masterbatch, the carbon black may be masked, so that the coupling reaction via the compound represented by the formula (I) can be inhibited. Therefore, rubbers other than the isoprene-based rubber, oil, processing aids, stearic acid, and antioxidants are preferably not kneaded in the step of preparing the masterbatch, but in a subsequent step. For the same reason, silica, silane coupling agents and the like are also preferably kneaded in a subsequent step. That is, in the step of preparing the masterbatch, only the isoprene-based rubber, the carbon black, and the compound represented by the formula (I) are preferably kneaded.

In the step of preparing the masterbatch, the discharge temperature is preferably 130 to 170° C. The kneading time varies depending on the dimensions of a kneader to be used, and may typically be about 2-5 minutes.

In the masterbatch, the amount of the carbon black is preferably 10 to 50 parts by mass, and more preferably 20 to 40 parts by mass, per 100 parts by mass of the isoprene-based rubber. Also, the amount of the compound represented by the formula (I) is preferably 0.5 to 5 parts by mass, and more preferably 1 to 3 parts by mass, per 100 parts by mass of the carbon black.

The rubber composition of the first aspect of the present invention can be used for tire treads.

The pneumatic tire of the first aspect of the present invention can be produced from the above rubber composition by an ordinary method. Specifically, the unvulcanized rubber composition appropriately containing additives is extruded and processed into the shape of a tire tread, and then arranged in an ordinary manner and assembled with other tire components in a tire building machine to form an unvulcanized tire. This unvulcanized tire is heat-pressurized in a vulcanizer, whereby a pneumatic tire of the present invention can be produced.

Second Aspect of the Present Invention

The rubber composition of the second aspect of the present invention includes an isoprene-based rubber, a butadiene rubber, a specific carbon black, sulfur, and a compound represented by the formula (I). The compound represented by the formula (I) binds to carbon black by a reaction of the nitrogen functional group at the terminal of the compound with a functional group, such as a carboxyl group, present at the surface of carbon black. Further, its carbon-carbon double bond site binds to polymers through a reaction with polymer radicals or a reaction involving sulfur crosslinking. As a result, the dispersibility of carbon black can be improved and this favorable dispersion state can be maintained during service. In addition, the polymers restrict the carbon black via the compound represented by the formula (I), resulting in a reduction in heat build-up. The rubber composition containing an isoprene-based rubber together with the compound represented by the formula (I), which provides these effects, as well as a butadiene rubber, a specific carbon black, and sulfur has improved fuel efficiency and further has favorable abrasion resistance, elongation at break, and processability.

The rubber component of the rubber composition of the second aspect of the present invention includes an isoprene-based rubber. A polymer chain of the isoprene-based rubber breaks to generate a radical during kneading. The compound represented by the formula (I) captures the radical, so that the polymer chain binds to the compound represented by the formula (I).

Examples of the isoprene-based rubber include natural rubber (NR), isoprene rubber (IR), epoxidized natural rubber (ENR), and highly purified natural rubber (HPNR). NR can be suitably used.

The amount of the isoprene-based rubber based on 100 mass % of the rubber component is 40 mass % or more, preferably 50 mass % or more. If the amount is less than 40 mass %, the fuel efficiency may not be sufficiently improved. The amount of the isoprene-based rubber is 75 mass % or less, preferably 70 mass % or less. If the amount is more than 75 mass %, sufficient abrasion resistance and crack growth resistance may not be secured.

The rubber component of the rubber composition of the second aspect of the present invention includes a butadiene rubber (BR). The BR is not particularly limited and may be one commonly used in the tire industry. The BR to be used is preferably at least one selected from the group consisting of a syndiotactic crystal-containing butadiene rubber (SPB-containing BR), a rare earth butadiene rubber (rare earth BR) synthesized in the presence of a rare earth catalyst, and a tin-modified butadiene rubber (tin-modified BR). The BR is more preferably a rare earth BR. The rare earth BR may suitably be one that is synthesized in the presence of a rare earth catalyst and has a vinyl content of 1.0 mass % or less (preferably 0.8 mass % or less) and a cis content of 95 mass % or more.

In the present invention, the values of the vinyl content (1,2-butadiene unit content) and the cis content (cis-1,4-butadiene unit content) are determined by infrared absorption spectrometry.

The combined amount of the SPB-containing BR, rare earth BR, and tin-modified BR based on 100 mass % of the rubber component is preferably 10 mass % or more, more preferably 30 mass % or more, and still more preferably 35 mass % or more. If the combined amount is less than 10 mass %, sufficient abrasion resistance and crack growth resistance may not be secured. The combined amount of the SPB-containing BR, rare earth BR, and tin-modified BR is preferably 60 mass % or less, and more preferably 50 mass % or less. If the combined amount is more than 60 mass %, the fuel efficiency may not be sufficiently improved.

The amount of BR based on 100 mass % of the rubber component is 25 mass % or more, preferably 30 mass % or more. If the amount is less than 25 mass %, sufficient abrasion resistance and crack growth resistance may not be secured. The amount of BR is 60 mass % or less, preferably 50 mass % or less. If the amount is more than 60 mass %, the fuel efficiency may not be sufficiently improved.

The rubber component of the rubber composition of the second aspect of the present invention may include other rubber(s) in addition to the isoprene-based rubber and BR. Examples of other rubbers include diene rubbers such as styrene-butadiene rubber (SBR), chloroprene rubber (CR), styrene-isoprene-butadiene rubber (SIBR), styrene-isoprene rubber (SIR), and isoprene butadiene rubber. SBR is preferred because it has an anti-reversion effect and is more effective to secure Hs. The SBR to be used may suitably be a modified SBR for silica formulation which has a terminal modified with an aminoalkoxysilane.

In cases where the rubber composition of the second aspect of the present invention includes SBR, the amount of SBR based on 100 mass % of the rubber component is preferably 1 to 20 mass % or more, and more preferably 5 to 15 mass %.

The rubber composition of the second aspect of the present invention contains a carbon black having a specific nitrogen adsorption specific surface area.

The nitrogen adsorption specific surface area ($N_2SA$) of the carbon black is 20 $m^2/g$ or more, preferably 30 $m^2/g$ or more, and more preferably 35 $m^2/g$ or more. If the $N_2SA$ is less than 20 $m^2/g$, sufficient abrasion resistance and elongation at break may not be secured. The $N_2SA$ of the carbon black is 90 $m^2/g$ or less, preferably 70 $m^2/g$ or less, and more preferably 55 $m^2/g$ or less. If the $N_2SA$ is more than 90 $m^2/g$, the heat build-up due to carbon black may increase and the carbon black is less likely to react with the compound represented by the formula (I), which may result in insufficient improvement of fuel efficiency.

The dibutyl phthalate (DBP) oil absorption of the carbon black is preferably 65 $cm^3/100$ g or more, and more preferably 80 $cm^3/100$ g or more. If the DBP oil absorption is less than 65 $cm^3/100$ g, sufficient Hs and elongation at break may not be secured. The DBP oil absorption of the carbon black is preferably 120 $cm^3/100$ g or less. If the DBP oil absorption is more than 120 $cm^3/100$ g, sufficient fuel efficiency may not be secured.

The preferred pH and volatile content of the carbon black are the same as mentioned for the first aspect of the present invention.

The amount of the carbon black per 100 parts by mass of the rubber component is 15 parts by mass or more, preferably 25 parts by mass or more. If the amount is less than 15 parts by mass, sufficient Hs and elongation at break may not be secured. The amount of the carbon black is 55 parts by mass or less, preferably 50 parts by mass or less, and more preferably 45 parts by mass or less. If the amount is more than 55 parts by mass, then the heat build-up may be so high that the fuel efficiency and processability can be deteriorated.

The rubber composition of the second aspect of the present invention includes the same compound represented by the formula (I) as used in the first aspect of the present invention.

The amount of the compound represented by the formula (I) per 100 parts by mass of the carbon black is 0.1 parts by mass or more, preferably 0.5 parts by mass or more, and more preferably 1 part by mass or more. If the amount is less than 0.1 parts by mass, the fuel efficiency may not be sufficiently improved. The amount of the compound represented by the formula (I) is 20 parts by mass or less, preferably 10 parts by mass or less, and more preferably 5 parts by mass or less. If the amount is more than 20 parts by mass, the Mooney viscosity, scorch resistance, and processability such as extrusion processability may not be sufficiently secured.

The rubber composition of the second aspect of the present invention includes sulfur. The sulfur is not particularly limited and may be one commonly used in the tire industry.

The amount of sulfur per 100 parts by mass of the rubber component is 1.0 part by mass or more, preferably 1.5 parts by mass or more. If the amount is less than 1.0 part by mass, the rubber composition may not be sufficiently cured and thus fail to have the required rubber properties. The amount of sulfur is 2.3 parts by mass or less. If the amount is more than 2.3 parts by mass, compound scorch or oxidative degradation during service may occur.

The amount of sulfur refers to the total sulfur content including sulfur derived from sulfur-containing coupling agents such as DURALINK HTS produced by Flexsys.

In the rubber composition of the second aspect of the present invention, a C5 petroleum resin is preferably used as a tackifier processing aid. C5 petroleum resins are obtained by polymerizing a C5 (carbon number: 5) petroleum hydrocarbons. The C5 petroleum hydrocarbons refers to C5 fraction (fraction with a carbon number of 5) obtained by thermal cracking of naphtha. Specific examples thereof include diolefins such as isoprene, 1,3-pentadiene, dicyclopentadiene, and piperylene; and monoolefins such as 2-methyl-1-butene, 2-methyl-2-butene, and cyclopentene. The amount of the C5 petroleum resin is preferably 0 to 5 parts by mass, and more preferably 0 to 3 parts by mass, per 100 parts by mass of the rubber component.

In the rubber composition of the second aspect of the present invention, a compound represented by formula (II) below and/or its hydrate are preferably used as a crosslinking agent.

$$XO_3S\text{—}S\text{—}(CH_2)_q\text{—}S\text{—}SO_3X \quad (II)$$

In the formula, q represents an integer of 3 to 10, and X represents lithium, potassium, sodium, magnesium, calcium, barium, zinc, nickel, or cobalt.

In the formula (II), q is preferably an integer of 3 to 6. Also, X is preferably potassium or sodium. Examples of the hydrate of the compound represented by the formula (II) include sodium salt monohydrates and sodium salt dihydrates. Preferred is sodium hexamethylene-1,6-bisthiosulfate dihydrate.

In cases where the rubber composition of the second aspect of the present invention includes the compound represented by the formula (II) and/or its hydrate, the amount thereof is preferably 0.2 to 5 parts by mass, and more preferably 0.5 to 3 parts by mass, per 100 parts by mass of the rubber component.

In addition to the above components, the rubber composition of the second aspect of the present invention may appropriately contain other additives usually used to produce a rubber composition, such as reinforcing filler (e.g., silica), a silane coupling agent, an antioxidant, oil, wax, and a vulcanization accelerator.

The amount of oil per 100 parts by mass of the rubber component is preferably 7 parts by mass or less, more preferably 4 parts by mass or less, and still more preferably 3 parts by mass or less. If the amount is more than 7 parts by mass, the reaction between the compound represented by the formula (I) and the functional group present at the surface of the carbon black may be inhibited. The lower limit of the amount of oil is not particularly limited, and may be 0 parts by mass.

The rubber composition of the second aspect of the present invention may be prepared by any known method, for example, by kneading the components using a known mixer such as a roll mill and a Banbury mixer.

The rubber composition of the second aspect of the present invention can be used for the following tire components: sidewalls, wings, base treads, sidewall packings, breaker cushions, and tie gums. The breaker cushion formed from the rubber composition of the present invention is suitable for tires for automobiles.

The wing is a component disposed at both sides of a tread rubber, and specifically a component shown in, for example, FIG. 1 of JP H09-277801A (which is incorporated by reference in the entirety).

The base tread is an inner layer of a multilayer tread. In a tread formed of two layers [an outer surface layer (cap tread) and an inner surface layer (base tread)], the base tread corresponds to the inner surface layer.

The sidewall packing is also called a soft bead apex and is a component tapering outwardly in a tire radial direction from a bead apex, and specifically a component shown in, for example, FIG. 1 of JP 2005-271857 A (which is incorporated by reference in the entirety).

The breaker cushion is a component disposed between the edge of a breaker and a carcass (case), and specifically a component shown in, for example, FIG. 1 of JP 2006-273934 A (which is incorporated by reference in the entirety).

The tie gum is a component disposed between carcass cords and an inner liner, and specifically a component shown in, for example, FIG. 1 of JP 2010-095705 A (which is incorporated by reference in the entirety).

The pneumatic tire of the second aspect of the present invention can be produced from the rubber composition by an ordinary method. Specifically, the unvulcanized rubber composition appropriately containing additives is extruded and processed into the shape of a tire component such as sidewall, and then arranged in an ordinary manner and assembled with other tire components in a tire building machine to form an unvulcanized tire. This unvulcanized tire is heat-pressurized in a vulcanizer, whereby a pneumatic tire of the present invention can be produced.

The pneumatic tires of the first and second aspects of the present invention can be used for, for example, tires for automobiles and heavy-load tires. In particular, the pneumatic tires can be suitably used as heavy-load tires containing a large amount of an isoprene-based rubber.

Examples

The invention will be more specifically described with reference to examples. However, the invention is not limited only thereto.

Examples Corresponding to the First Aspect of the Present Invention

Chemicals used in examples and comparative examples shown in Tables 1 and 2 are listed below.
NR: TSR20
IR: IR2200
High-cis BR 1: BUNA-CB25 (rare earth BR synthesized in the presence of Nd catalyst, vinyl content: 0.7 mass %, cis content: 97 mass %) produced by LANXESS
High-cis BR 2: BUNA-CB22 (rare earth BR synthesized in the presence of Nd catalyst, vinyl content: 0.6 mass %, cis content: 97 mass %) produced by LANXESS
High-cis BR 3: BR150B (BR synthesized in the presence of Co catalyst, cis content: 98 mass %) produced by UBE INDUSTRIES, LTD.
Modified BR1: N103 (having a terminal modified with a mixture of tetraglycidyl-1,3-bisaminomethylcyclohexane and its oligomers, cis content: 38 mass %) produced by Asahi Kasei Chemicals Corp.
Modified BR2: S (modified BR having a terminal modified with a nitrogen functional group-containing alkoxysilane, cis content: 40 mass %) produced by Sumitomo Chemical Co., Ltd.
Modified BR3: BR1250H (tin-modified BR prepared by polymerization using a lithium initiator, cis content: 40 mol %) produced by ZEON CORPORATION
SBR: SBR1723 produced by JSR Corporation
Compound 1: (2Z)-4-[(4-aminophenyl)amino]-4-oxo-2-butenoic acid sodium salt (compound represented by the following formula) produced by Sumitomo Chemical Co., Ltd.

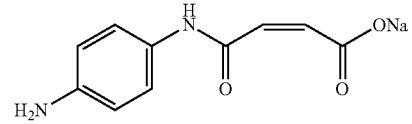

S-(3-aminopropyl)thiosulfuric acid: S-(3-aminopropyl)thiosulfuric acid (compound represented by the following formula) produced by Sumitomo Chemical Co., Ltd.

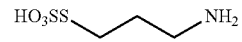

Carbon black 1: SHOBLACK N220 ($N_2SA$: 114 $m^2/g$, DBP oil absorption: 115 $cm^3/100$ g, pH: 7.5, volatile content: 1.8 mass %) produced by Cabot Japan K.K.
Carbon black 2: SHOBLACK N330 ($N_2SA$: 78 $m^2/g$, DBP oil absorption: 102 $cm^3/100$ g, pH: 7.4, volatile content: 1.8 mass %) produced by Cabot Japan K.K.
Carbon black 3: N326 ($N_2SA$: 78 $m^2/g$, DBP oil absorption: 72 $cm^3/100$ g, pH: 7.6, volatile content: 1.5 mass %) produced by Columbian Chemicals Company
Finely divided carbon black 1: HP160 ($N_2SA$: 165 $m^2/g$, DBP oil absorption: 128 $cm^3/100$ g, pH: 7.5, volatile content: 1.9 mass %) produced by Columbian Chemicals Company
Finely divided carbon black 2: a trial product ($N_2SA$: 231 $m^2/g$, DBP oil absorption: 190 $cm^3/100$ g, pH: 6.8, volatile content: 1.5 mass %) produced by Mitsubishi Chemical Corporation
Finely divided carbon black 3: a trial product ($N_2SA$: 269 $m^2/g$, DBP oil absorption: 186 $cm^3/100$ g, pH: 6.5, volatile content: 1.6 mass %) produced by Mitsubishi Chemical Corporation
Silica: U9000Gr produced by Evonik Degussa
Silane coupling agent: Si75 produced by Evonik Degussa
TDAE Oil: Vivatec produced by H&R
Wax: Ozoace 355 produced by Nippon Seiro Co., Ltd.
Antioxidant 6PPD: Antigene 6C produced by Sumitomo Chemical Co., Ltd.

Antioxidant TMQ: NOCRAC 224 produced by Ouchi Shinko Chemical Industrial Co., Ltd.
Aktiplast pp: Aktiplast pp (fatty acid zinc salt) produced by Rhein Chemie
Stearic acid: Stearic acid "TSUBAKI" produced by NOF Corporation
Zinc oxide: Ginrei R produced by Toho Zinc Co., Ltd.
5% Oil-containing powder sulfur: HK-200-5 produced by Hosoi Chemical Industry Co., Ltd.
Vulcanization accelerator TBBS: Nocceler NS-G produced by Ouchi Shinko Chemical Industrial Co., Ltd.
KA9188: Vulcuren KA9188 (1,6-bis(N,N'-dibenzylthiocarbamoyldithio)hexane) produced by LANXESS Examples and Comparative Examples Production Method A (Base Kneading Step 1)

Eighty parts by mass of a rubber component (in favor of isoprene-based rubber), 30 parts by mass of carbon black (in favor of finely divided carbon black), and the whole amount of compound I were kneaded for 4 minutes using a 1.7-L Banbury mixer produced by KOBE STEEL, LTD., and the resulting mixture was discharged at 150° C. Thus, a masterbatch was obtained.

(Base Kneading Step 2)

To the resulting masterbatch were added the rest of the rubber component and carbon black, and materials other than sulfur, a vulcanization accelerator, and KA9188. Kneading was performed for 4 minutes using the Banbury mixer, and the resulting mixture was discharged at 150° C. Thus, a kneaded mixture was obtained.

(Final Kneading Step)

To the resulting kneaded mixture were added the sulfur, vulcanization accelerator, and KA9188. Kneading was performed for 2 minutes using an open roll mill, and the resulting mixture was discharged at 105° C. Thus, an unvulcanized rubber composition was obtained.

(Vulcanization Step)

The unvulcanized rubber composition was press-vulcanized at 150° C. for 30 minutes to prepare a vulcanized rubber composition.

Production Method B

A vulcanized rubber composition was prepared in the same manner as in the production method A, except that the whole amount of a rubber component, 30 parts by mass of carbon black (in favor of finely divided carbon black), and the whole amount of compound I were added in the base kneading step 1.

The thus obtained vulcanized rubber compositions were evaluated as follows. Tables 1 and 2 show the test results.

(Viscoelasticity Test)

The complex modulus $E^*$ (MPa) and the loss tangent tan $\delta$ of each vulcanized rubber composition were measured using a viscoelasticity spectrometer VES produced by Iwamoto Seisakusho Co., Ltd. at a temperature of 70° C., a frequency of 10 Hz, an initial strain of 10%, and a dynamic strain of 2%. A larger value of $E^*$ indicates higher rigidity and higher handling stability. A smaller value of tan $\delta$ indicates less heat build-up and better fuel efficiency. The value of tan $\delta$ is also expressed as an index relative to that of Comparative Example 1 (=100). A larger index value indicates better fuel efficiency.

(Tensile Test)

A No. 3 dumbbell test piece formed of each vulcanized rubber composition was subjected to a tensile test at room temperature according to JIS K 6251 "Rubber, vulcanized or thermoplastic—Determination of tensile stress-strain properties," to measure the elongation at break EB (%). A larger value of EB indicates higher elongation at break (durability). The value of EB is also expressed as an index relative to that of Comparative Example 1 (=100). A larger index value indicates higher elongation at break.

(Abrasion Resistance)

The volumetric loss of each vulcanized rubber composition was measured using a LAT tester (Laboratory Abrasion and Skid Tester) at a load of 100 N, a speed of 20 km/h, and a slip angle of 6°. The measured volumetric loss is expressed as an index using the following equation. A larger index value indicates higher abrasion resistance.

(Abrasion resistance index)=(volumetric loss of Comparative Example 1)/(volumetric loss of each formulation)×100

TABLE 1

| | Rubber composition for tread | 1 | 2 | 3 | 4 | 5 | 6 | 7 | 8 | 9 | 10 | 11 | 12 | 13 |
|---|---|---|---|---|---|---|---|---|---|---|---|---|---|---|
| Production method | | A | A | A | A | A | A | A | A | A | A | A | A | A |
| Formulation (part by mass) | NR | 60 | 60 | 60 | 60 | 60 | 60 | 60 | 60 | 60 | 80 | 10 | 60 | 60 |
| | IR | 20 | 20 | 20 | 20 | 20 | 20 | 20 | 20 | 20 | — | 20 | — | 20 |
| | High-cis BR1(CB25) | 20 | 20 | — | 20 | 20 | 20 | 20 | — | — | 20 | 70 | — | 20 |
| | High-cis BR2(CB22) | — | — | — | — | — | — | — | — | — | — | — | — | — |
| | High-cis BR3(BR150B) | — | — | — | — | — | — | — | — | — | — | — | — | — |
| | Modified BR1(N103) | — | — | — | — | — | — | — | 20 | — | — | — | — | — |
| | Modified BR2(S) | — | — | — | — | — | — | — | — | 20 | — | — | 20 | — |
| | Modified BR3(BR1250H) | — | — | — | — | — | — | — | — | — | — | — | — | — |
| | SBR | — | — | — | — | — | — | — | — | — | — | — | — | — |
| | Compound I | — | — | 1 | 1 | 1 | 1 | 1 | 1 | 1 | 1 | 1 | — | 1 |
| | S-(3-aminopropyl)thiosulfuric acid | 10 | 48 | 10 | — | 10 | — | — | — | — | — | — | — | — |
| | Carbon black 1(N220) | — | — | — | 50 | — | — | — | — | — | — | — | — | 10 |
| | Carbon black 2(N330) | — | — | — | — | — | — | — | — | — | 10 | 10 | 10 | — |
| | Carbon black 3(N326) | — | — | — | — | — | — | — | — | — | — | — | — | — |
| | Finely divided carbon black 1 (HP160) | 40 | 10 | 40 | 7 | 40 | 40 | 40 | 40 | 40 | 40 | 40 | 40 | 40 |
| | Finely divided carbon black 2 (trial product) | — | — | — | 0.56 | — | — | — | — | — | — | — | — | — |
| | Finely divided carbon black 3 (trial product) | — | — | — | — | — | — | — | — | — | — | — | — | — |
| | Silica | — | — | — | — | — | — | — | — | — | — | — | — | — |
| | Silane coupling agent | — | — | — | — | — | — | — | — | — | — | — | — | — |
| | TDAE oil | 1.5 | 1.5 | 1.5 | 1.5 | 1.5 | 1.5 | 1.5 | 1.5 | 1.5 | 1.5 | 1.5 | 1.5 | 1.5 |
| | Wax | 3 | 3 | 3 | 3 | 3 | 3 | 3 | 3 | 3 | 3 | 3 | 3 | 3 |
| | Antioxidant 6PPD | 1 | 1 | 1 | 1 | 1 | 1 | 1 | 1 | 1 | 1 | 1 | 1 | 1 |
| | Antioxidant TMQ | — | — | — | — | — | — | — | — | — | — | — | — | — |
| | Aktiplast pp | — | — | — | — | — | — | — | — | — | — | — | — | — |
| | Stearic acid | 3.5 | 3.5 | 3.5 | 3.5 | 3.5 | 3.5 | 3.5 | 3.5 | 3.5 | 3.5 | 3.5 | 3.5 | 3.5 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 |
| | 5% Oil-containing powder sulfur | 0.7 | 0.7 | 0.7 | 0.7 | 0.3 | 0.29 | 1.7 | 0.7 | 0.7 | 0.7 | 0.7 | 0.7 | 0.7 |
| | Net sulfur content | 0.67 | 0.67 | 0.67 | 0.67 | — | — | — | 0.67 | 0.67 | 0.67 | 0.67 | 0.67 | 0.67 |
| | Vulcanization accelerator TBBS | 2.5 | 2.5 | 2.5 | 2.5 | 2.5 | 2.5 | 1.62 | 2.5 | 2.5 | 2.5 | 2.5 | 2.5 | 2.5 |
| | KA9188 | — | — | — | — | 4.5 | 3.5 | 1.2 | — | — | — | — | — | — |
| | Net sulfur content | — | — | — | — | 0.3 | 0.6 | — | — | — | — | — | — | — |
| | (Compound I content/Carbon black content) × 100 | — | — | 2.0 | 2.0 | 2.0 | 0.2 | 2.0 | 2.0 | 2.0 | 2.0 | 2.0 | — | — |
| Evaluation | E* Target: 5.2–6.25 | 5.75 | 5.56 | 5.88 | 5.74 | 5.45 | 5.65 | 6.15 | 5.45 | 5.25 | 5.42 | 6.15 | 6.09 | 5.77 |
| | tan δ Target: ≤0.090 | 0.098 | 0.107 | 0.104 | 0.084 | 0.084 | 0.082 | 0.096 | 0.079 | 0.074 | 0.074 | 0.105 | 0.115 | 0.080 |
| | EB % Primary target: >410, Secondary target: >450 | 475 | 515 | 445 | 560 | 415 | 425 | 585 | 425 | 415 | 545 | 400 | 485 | 415 |
| | tan δ index Target: ≥110 | 100 | 92 | 94 | 117 | 117 | 120 | 102 | 124 | 132 | 132 | 93 | 85 | 123 |
| | EB index Primary target: ≥85, Secondary target: ≥90 | 100 | 108 | 94 | 118 | 87 | 89 | 123 | 89 | 87 | 115 | 84 | 102 | 87 |
| | Abrasion resistance index Target: ≥90 | 100 | 89 | 102 | 70 | 95 | 102 | 88 | 80 | 79 | 65 | 120 | 100 | 85 |
| | Average of three indexes Primary target: >100, Secondary target: >105 | 100 | 96 | 97 | 102 | 100 | 104 | 104 | 98 | 100 | 104 | 99 | 96 | 98 |

TABLE 2

| Production method | Rubber composition for tread | | Example | | | | | | | | | | | | | |
|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 |
| Formulation (part by mass) | NR | | A | A | A | A | A | A | A | A | A | A | A | A | A | A |
| | IR | | 60 | 60 | 60 | 60 | 60 | 60 | 60 | 60 | 40 | 60 | 60 | 75 | 35 | 60 |
| | High-cis BR1(CB25) | | 20 | 20 | 20 | 20 | 20 | 20 | 20 | 20 | 20 | 20 | — | 20 | 65 | 20 |
| | High-cis BR2(CB22) | | 20 | 20 | 20 | 20 | 20 | 20 | 20 | 20 | 40 | 20 | 20 | 5 | — | — |
| | High-cis BR3(BR150B) | | — | — | — | — | — | — | — | — | — | — | — | — | — | — |
| | Modified BR1(N103) | | — | — | — | — | — | — | — | — | — | — | — | — | — | — |
| | Modified BR2(S) | | — | — | — | — | — | — | — | — | — | — | — | — | — | — |
| | Modified BR3(BR1250H) | | — | — | — | — | — | — | — | — | — | — | — | — | — | — |
| | SBR | | — | — | — | — | 35 | — | — | — | — | — | — | — | — | 20 |
| | Compound I | | 1 | 3 | 5 | 1 | 1 | — | 1 | 1 | 2 | 1 | 1 | 1 | 5 | 1 |
| | S-(3-aminopropyl)thiosulfuric acid | | — | — | — | — | — | — | — | — | — | — | — | — | — | — |
| | Carbon black 1(N220) | | 10 | 10 | 10 | 40 | — | — | 10 | 10 | 10 | 10 | 10 | 10 | 10 | 10 |
| | Carbon black 2(N330) | | — | — | — | — | — | — | — | — | — | — | — | — | — | — |
| | Carbon black 3(N326) | | — | — | — | — | 20 | — | — | — | — | — | — | — | — | — |
| | Finely divided carbon black 1 (HP160) | | 40 | 40 | 40 | — | — | 40 | 40 | 40 | 40 | 40 | — | 40 | 40 | 40 |
| | Finely divided carbon black 2 (trial product) | | — | — | — | — | — | — | — | — | — | — | 40 | — | — | — |
| | Finely divided carbon black 3 (trial product) | | — | — | — | 7 | — | — | — | — | — | — | — | — | — | — |
| | Silica | | — | — | — | 0.56 | — | — | — | — | — | — | — | — | — | — |
| | Silane coupling agent | | — | — | — | — | — | — | 2 | — | — | — | — | — | — | — |
| | TDAE oil | | — | — | — | — | — | — | 0.6 | — | — | — | — | — | — | — |
| | Wax | | 1.5 | 1.5 | 1.5 | 1.5 | 1.5 | 1.5 | 1.5 | 1.5 | 1.5 | 1.5 | 1.5 | 1.5 | 1.5 | 1.5 |
| | Antioxidant 6PPD | | 3 | 3 | 3 | 3 | 3 | 3 | 3 | 3 | 3 | 3 | 3 | 3 | 3 | 3 |
| | Antioxidant TMQ | | 1 | 1 | 1 | 1 | 1 | 1 | 1 | 1 | 1 | 1 | 1 | 1 | 1 | 1 |
| | Aktiplast pp | | 3.5 | 3.5 | 3.5 | 3.5 | 3.5 | 3.5 | 3.5 | 3.5 | 3.5 | 3.5 | 3.5 | 3.5 | 3.5 | 3.5 |
| | Stearic acid | | 2.5 | 2.5 | 2.5 | 2.5 | 2.5 | 2.5 | 2.5 | 2.5 | 2.5 | 2.5 | 2.5 | 2.5 | 2.5 | 2.5 |
| | Zinc oxide | | 0.7 | 0.7 | 0.7 | 0.7 | 0.7 | 0.7 | 0.5 | 1.4 | 0.7 | 0.7 | 0.7 | 0.7 | 0.7 | 0.7 |
| | 5% Oil-containing powder sulfur | | 0.67 | 0.67 | 0.67 | 0.67 | 0.67 | 0.67 | 0.48 | 1.33 | 0.67 | 0.67 | 0.67 | 0.67 | 0.67 | 0.67 |
| | Net sulfur content | | 2.0 | 2.5 | 2.5 | 2.5 | 2.5 | 2.5 | 2.0 | 1.5 | 2.5 | — | 2.5 | 2.5 | 2.5 | 2.5 |
| | Vulcanization accelerator TBBS | | — | — | — | — | — | — | 0.6 | — | — | — | — | — | — | — |
| | KA9188 | | — | — | — | — | — | — | — | — | — | — | — | — | — | — |
| | Net sulfur content | | — | — | — | — | — | — | — | — | — | — | — | — | — | — |
| Evaluation | (Compound I content/Carbon black content) × 100 | | 2.0 | 6.0 | 10.0 | 2.0 | 1.8 | 2.5 | 2.0 | 2.0 | 4.0 | 2.0 | 2.0 | 2.0 | 10.0 | 2.0 |
| | E* | Target: 5.2–6.25 | 5.76 | 5.81 | 5.89 | 5.56 | 5.65 | 5.55 | 5.87 | 5.76 | 5.98 | 5.88 | 5.51 | 5.44 | 5.76 | 5.77 |
| | tan δ | Target: ≤0.090 | 0.081 | 0.077 | 0.075 | 0.075 | 0.069 | 0.068 | 0.068 | 0.084 | 0.076 | 0.079 | 0.084 | 0.085 | 0.089 | 0.070 |
| | EB % | Primary target: >410, Secondary target: >450 | 480 | 485 | 480 | 520 | 470 | 455 | 495 | 540 | 455 | 470 | 465 | 515 | 455 | 415 |
| | tan δ index | Target: ≥110 | 121 | 127 | 131 | 131 | 142 | 144 | 144 | 117 | 129 | 124 | 117 | 115 | 110 | 140 |
| | EB index | Primary target: ≥85, Secondary target: ≥90 | 101 | 102 | 101 | 109 | 99 | 96 | 104 | 114 | 96 | 99 | 98 | 108 | 96 | 87 |
| | Abrasion resistance index | Target: ≥90 | 102 | 104 | 104 | 98 | 92 | 100 | 112 | 105 | 113 | 106 | 102 | 94 | 119 | 90 |
| | Average of three indexes | Primary target: >100, Secondary target: >105 | 108 | 111 | 112 | 113 | 111 | 113 | 120 | 112 | 113 | 110 | 106 | 106 | 108 | 106 |

TABLE 2-continued

| Rubber composition for tread | | Example | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 |
| Production method | | A | A | A | A | A | A | A | A | A | A | B | B | B |
| Formulation (part by mass) | NR | 60 | 60 | 60 | 60 | 60 | 60 | 60 | 60 | 60 | 60 | 60 | 40 | 35 |
| | IR | 20 | 20 | 20 | 20 | 20 | 20 | 20 | 20 | 20 | 20 | 20 | 20 | — |
| | High-cis BR1(CB25) | 20 | 20 | 20 | 20 | 20 | 20 | 20 | 20 | 20 | 20 | 20 | 40 | 65 |
| | High-cis BR2(CB22) | — | — | — | — | — | — | — | — | — | — | — | — | — |
| | High-cis BR3(BR150B) | — | — | — | — | — | — | — | — | — | — | — | — | — |
| | Modified BR1(N103) | — | — | — | — | — | — | — | — | — | — | — | — | — |
| | Modified BR2(S) | — | — | — | — | — | — | — | — | — | — | — | — | — |
| | Modified BR3(BR1250H) | — | — | — | — | — | — | — | — | — | — | — | — | — |
| | SBR | — | — | — | — | — | — | — | — | — | — | — | — | 5 |
| | Compound I | 1 | 1 | 1 | 1 | 1 | 1 | 1 | 1 | 1 | 1 | 1 | 2 | — |
| | S-(3-aminopropyl)thiosulfuric acid | — | — | — | — | — | — | — | — | — | — | — | — | — |
| | Carbon black 1(N220) | 10 | 10 | 10 | 10 | 10 | 12 | 12 | 10 | 10 | 10 | 10 | 10 | 10 |
| | Carbon black 2(N330) | — | — | — | — | — | — | — | — | — | — | — | — | — |
| | Carbon black 3(N326) | — | — | — | — | — | — | — | — | — | — | — | — | — |
| | Finely divided carbon black 1 (HP160) | 40 | 40 | 40 | 40 | 40 | 40 | 40 | 40 | 40 | 40 | — | — | — |
| | Finely divided carbon black 2 (trial product) | — | — | — | — | — | — | — | — | — | — | 40 | 40 | 40 |
| | Finely divided carbon black 3 (trial product) | — | — | — | — | — | — | — | — | — | — | — | — | — |
| | Silica | — | — | — | — | — | — | — | — | — | — | — | — | — |
| | Silane coupling agent | — | — | — | — | — | — | — | — | — | — | — | — | — |
| | TDAE oil | — | — | — | — | — | 4 | 8 | — | — | — | — | — | — |
| | Wax | 1.5 | 1.5 | 1.5 | 1.5 | 1.5 | 1.5 | 1.5 | 1.5 | 1.5 | 1.5 | 1.5 | 1.5 | 1.5 |
| | Antioxidant 6PPD | 3 | 3 | 3 | 3 | 3 | 3 | 3 | 3 | 3 | 3 | 3 | 3 | 3 |
| | Antioxidant TMQ | 1 | 1 | 1 | 1 | 1 | 1 | 1 | 1 | 1 | 1 | 1 | 1 | 1 |
| | Aktiplast pp | — | — | — | 2.5 | 3.5 | — | — | — | — | — | — | — | — |
| | Stearic acid | 2.5 | 5 | 7 | 3.5 | 1.5 | 3.5 | 3.5 | 3.5 | 3.5 | 3.5 | 3.5 | 3.5 | 3.5 |
| | Zinc oxide | 2.5 | 2.5 | 2.5 | 2.5 | 2.5 | 2.5 | 2.5 | 2 | 4 | 6 | 2.5 | 2.5 | 2.5 |
| | 5% Oil-containing powder sulfur | 0.7 | 0.7 | 0.7 | 0.7 | 0.7 | 0.7 | 0.7 | 0.7 | 0.7 | 0.7 | 0.7 | 0.7 | 0.7 |
| | Net sulfur content | 0.67 | 0.67 | 0.67 | 0.67 | 0.67 | 0.67 | 0.67 | 0.67 | 0.67 | 0.67 | 0.67 | 0.67 | 0.67 |
| | Vulcanization accelerator TBBS | 2.5 | 2.5 | 2.5 | 2.5 | 2.5 | 2.5 | 3.0 | 2.5 | 2.5 | 2.5 | 2.0 | 2.5 | 2.5 |
| | KA9188 | — | — | — | — | — | — | — | — | — | — | — | — | — |
| | Net sulfur content | — | — | — | — | — | — | — | — | — | — | — | — | — |
| (Compound I content/Carbon black content) × 100 | | 2.0 | 2.0 | 2.0 | 2.0 | 2.0 | 1.9 | 1.9 | 2.0 | 2.0 | 2.0 | 2.0 | 4.0 | 10.0 |
| Evaluation | E* Target: 5.2-6.25 | 5.77 | 5.84 | 5.88 | 5.99 | 5.89 | 5.77 | 5.81 | 5.72 | 5.95 | 6.02 | 5.65 | 5.84 | 5.35 |
| | tan δ Target: ≤0.090 | 0.081 | 0.08 | 0.06 | 0.079 | 0.079 | 0.086 | 0.086 | 0.082 | 0.079 | 0.078 | 0.084 | 0.080 | 0.087 |
| | EB % Primary target: >410, Secondary target: >450 | 485 | 480 | 450 | 450 | 465 | 485 | 480 | 470 | 495 | 515 | 470 | 450 | 450 |
| | tan δ index Target: ≥110 | 121 | 123 | 123 | 124 | 124 | 114 | 114 | 120 | 124 | 126 | 117 | 123 | 113 |
| | EB index Primary target: ≥85, Secondary target: ≥90 | 102 | 101 | 95 | 95 | 98 | 102 | 101 | 99 | 104 | 108 | 99 | 95 | 95 |
| | Abrasion resistance index Target: ≥90 | 101 | 103 | 100 | 96 | 101 | 98 | 99 | 103 | 95 | 90 | 101 | 111 | 95 |
| | Average of three indexes Primary target: >100, Secondary target: >105 | 108 | 109 | 106 | 105 | 108 | 105 | 105 | 107 | 108 | 108 | 106 | 109 | 101 |

Tables 1 and 2 show that, in the examples using predetermined amounts of an isoprene-based rubber, a specific high-cis butadiene rubber, a specific carbon black, sulfur, and a compound represented by the formula (I), the fuel efficiency, abrasion resistance, and elongation at break were improved in a balanced manner. The handling stability was also favorable.

Comparison of Examples 1 and 25, comparison of Examples 9 and 26, and comparison of Examples 13 and 27 show that the compositions prepared by the production method A, in which the isoprene-based rubber was preferentially added in the base kneading step 1, had better properties.

Examples Corresponding to the Second Aspect of the Present Invention

Chemicals used in examples and comparative examples shown in Tables 3 and 4 are listed below.
NR: TSR20
IR: IR2200
BR 1: BUNA-CB25 (rare earth BR synthesized in the presence of Nd catalyst, vinyl content: 0.7 mass %, cis content: 97 mass %) produced by LANXESS
BR 2: BUNA-CB22 (rare earth BR synthesized in the presence of Nd catalyst, vinyl content: 0.6 mass %, cis content: 97 mass %) produced by LANXESS
BR 3: BR150B (BR synthesized in the presence of Co catalyst, cis content: 98 mass %) produced by UBE INDUSTRIES, LTD.
BR 4: VCR617 (SPB-containing BR, SPB content: 17 mass %) produced by UBE INDUSTRIES, LTD.
BR 5: BR1250H (tin-modified BR) produced by ZEON CORPORATION
SBR: HPR340 (modified SBR having a terminal modified with an aminoalkoxysilane) produced by JSR Corporation
Compound I: (2Z)-4-[(4-aminophenyl)amino]-4-oxo-2-butenoic acid sodium salt (compound represented by the following formula) produced by Sumitomo Chemical Co., Ltd.

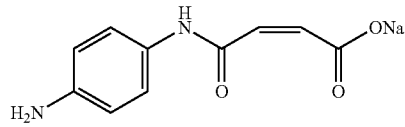

S-(3-aminopropyl)thiosulfuric acid: S-(3-aminopropyl)thiosulfuric acid (compound represented by the following formula) produced by Sumitomo Chemical Co., Ltd.

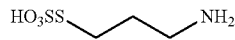

Carbon black 1: Statex N550 ($N_2SA$: 40 $m^2/g$, DBP oil absorption: 115 $cm^3/100$ g, pH: 6.8, volatile content: 1.8 mass %) produced by Columbian Chemicals Company
Carbon black 2: Statex N660 ($N_2SA$: 34 $m^2/g$, DBP oil absorption: 82 $cm^3/100$ g, pH: 7.7, volatile content: 1.7 mass %) produced by Columbian Chemicals Company
Carbon black 3: Statex N330 ($N_2SA$: 78 $m^2/g$, DBP oil absorption: 102 $cm^3/100$ g, pH: 7.4, volatile content: 1.8 mass %) produced by Columbian Chemicals Company
Carbon black 4: Statex N762 ($N_2SA$: 29 $m^2/g$, DBP oil absorption: 68 $cm^3/100$ g, pH: 6.9, volatile content: 1.0 mass %) produced by Columbian Chemicals Company
Carbon black 5: Statex N220 ($N_2SA$: 114 $m^2/g$, DBP oil absorption: 114 $cm^3/100$ g, pH: 7.5, volatile content: 1.8 mass %) produced by Columbian Chemicals Company
Silica: U9000Gr produced by Evonik Degussa
Silane coupling agent: Si75 produced by Evonik Degussa
C5 petroleum resin: Marukarez T-100AS (softening point: 102° C.) produced by Maruzen Petrochemical Co., Ltd.
TDAE oil: Vivatec produced by H&R
Wax: Ozoace 355 produced by Nippon Seiro Co., Ltd.
Antioxidant 6PPD: Antigene 6C produced by Sumitomo Chemical Co., Ltd.
Antioxidant TMQ: NOCRAC 224 produced by Ouchi Shinko Chemical Industrial Co., Ltd.
Stearic acid: Stearic acid "TSUBAKI" produced by NOF Corporation
Zinc oxide: Ginrei R produced by TOHO ZINC CO., LTD.
5% Oil-containing powder sulfur: HK-200-5 produced by Hosoi Chemical Industry Co., Ltd.
Vulcanization accelerator TBBS: Nocceler NS-G produced by Ouchi Shinko Chemical Industrial Co., Ltd.
HTS: DURALINK HTS (sodium hexamethylene-1,6-bisthiosulfate dihydrate) produced by Flexsys.

Examples and Comparative Examples

Base Kneading Step 1

Seventy parts by mass of a rubber component (in favor of isoprene-based rubber), 30 parts by mass of carbon black (in favor of carbon black with a larger $N_2SA$), and the whole amount of compound I were kneaded for 4 minutes using a 1.7-L Banbury mixer produced by KOBE STEEL, LTD., and the resulting mixture was discharged at 150° C. Thus, a masterbatch was obtained. With regard to Example 36, since the amount of carbon black was less than 30 parts by mass, the whole amount of carbon black (25 parts by mass) was added in this step.

Base Kneading Step 2

To the resulting masterbatch were added the rest of the rubber component and carbon black, and materials other than sulfur, a vulcanization accelerator, and HTS. Kneading was performed for 4 minutes using the Banbury mixer, and the resulting mixture was discharged at 150° C. Thus, a kneaded mixture was obtained.

Final Kneading Step

To the resulting kneaded mixture were added the sulfur, vulcanization accelerator, and HTS. Kneading was performed for 2 minutes using an open roll mill, and the resulting mixture was discharged at 105° C. Thus, an unvulcanized rubber composition was obtained.

(Vulcanization Step)

The unvulcanized rubber composition was press-vulcanized at 150° C. for 30 minutes to prepare a vulcanized rubber composition.

The thus obtained unvulcanized rubber compositions and vulcanized rubber compositions were evaluated as follows. Tables 3 and 4 show the test results.

(Viscoelasticity Test)

The complex modulus E* (MPa) and the loss tangent tan δ of each vulcanized rubber composition were measured using a viscoelasticity spectrometer VES produced by Iwamoto Seisakusho Co., Ltd. at a temperature of 70° C., a frequency of 10 Hz, an initial strain of 10%, and a dynamic strain of 2%.

A larger value of E* indicates higher rigidity and higher handling stability. A smaller value of tan δ indicates less heat build-up and better fuel efficiency. The value of tan δ is also expressed as an index relative to that of Comparative Example 14 (=100). A larger index value indicates better fuel efficiency.

(Tensile Test)

A No. 3 dumbbell test piece formed of each vulcanized rubber composition was subjected to a tensile test at room temperature according to JIS K 6251 "Rubber, vulcanized or thermoplastic—Determination of tensile stress-strain properties," to measure the elongation at break EB (%). A larger value of EB indicates higher elongation at break (durability). The value of EB is also expressed as an index relative to that of Comparative Example 14 (=100). A larger index value indicates higher elongation at break.

(Abrasion Resistance)

The volumetric loss of each vulcanized rubber composition was measured using a LAT tester (Laboratory Abrasion and Skid Tester) at a load of 75 N, a speed of 20 km/h, and a slip angle of 5°. The measured volumetric loss is expressed as an index relative to that of Comparative Example 14 (=100). A larger index value indicates higher abrasion resistance.

(Processability)

Each unvulcanized rubber composition was extruded and then formed into a predetermined sidewall shape. The thus formed products were visually and tactually evaluated for edge conditions, compound scorch, the degree of adhesion between rubber products, and flatness. The results are expressed as an index relative to that of Comparative Example 14 (=100). A greater value indicates better processability (sheet processability).

With respect to the edge conditions, very straight and smooth edges were evaluated as good. With respect to the compound scorch, when a 15-cm-square, 2-mm-thick sheet was cut out of the formed product, the sheet having no irregularities due to cured bits was evaluated as good. With respect to the flatness, the sheet that was flat enough to adhere tightly to a flat plate was evaluated as good.

TABLE 3

| | Rubber composition for sidewall | | Example | | | | | | |
|---|---|---|---|---|---|---|---|---|---|
| | | | 28 | 29 | 30 | 31 | 32 | 33 | 34 |
| Formulation (part by mass) | NR | | 60 | 60 | 40 | 60 | 60 | 40 | 40 |
| | IR | | — | — | 20 | — | — | 20 | 20 |
| | BR1(CB25) | | 40 | 40 | 40 | 40 | 40 | 40 | 40 |
| | BR2(CB22) | | — | — | — | — | — | — | — |
| | BR3(BR150B) | | — | — | — | — | — | — | — |
| | BR4(VCR617) | | — | — | — | — | — | — | — |
| | BR5(BR1250H) | | — | — | — | — | — | — | — |
| | SBR(HPR340) | | — | — | — | — | — | — | — |
| | Compound I | | 1 | 2 | 3 | 1 | 1 | 1 | 1 |
| | S-(3-aminopropyl)thiosulfrric acid | | — | — | — | — | — | — | — |
| | Carbon black 1(N550) | | 30 | 30 | 30 | — | 10 | — | 15 |
| | Carbon black 2(N660) | | — | — | — | 35 | — | — | — |
| | Carbon black 3(N330) | | — | — | — | — | — | 25 | — |
| | Carbon black 4(N762) | | — | — | — | — | 45 | — | — |
| | Carbon black 5(N220) | | — | — | — | — | — | — | 18 |
| | Silica | | 10 | 10 | 10 | 10 | — | 10 | — |
| | Silane coupling agent | | — | — | — | 13 | — | — | — |
| | C5 petroleum resin | | 2 | 2 | 2 | 2 | 2 | 2 | 2 |
| | TDAE oil | | 2 | 2 | 2 | 2 | 2 | 2 | 2 |
| | Wax | | 1.5 | 1.5 | 1.5 | 1.5 | 1.5 | 1.5 | 1.5 |
| | Antioxidant 6PPD | | 3 | 3 | 3 | 3 | 3 | 3 | 3 |
| | Antioxidant TMQ | | 1 | 1 | 1 | 1 | 1 | 1 | 1 |
| | Stearic acid | | 2 | 2 | 2 | 2 | 2 | 2 | 2 |
| | Zinc oxide | | 4 | 4 | 4 | 4 | 4 | 4 | 4 |
| | 5% Oil-containing powder sulfur | | 2.1 | 2.1 | 2.1 | 2.1 | 1.9 | 2.1 | 2.1 |
| | Net sulfur content | | 2.0 | 2.0 | 2.0 | 2.0 | 1.8 | 2.0 | 2.0 |
| | Vulcanization accelerator TBBS | | 0.8 | 0.8 | 0.8 | 0.8 | 0.8 | 0.8 | 0.8 |
| | HTS | | — | — | — | — | — | — | — |
| | Net sulfur content | | | | | | | | |
| (Compound I content/Carbon black content) × 100 | | | 3.33 | 6.67 | 10.00 | 2.86 | 1.82 | 4.00 | 3.03 |
| Performance | E* | Target: 3.5-4.5 | 4.06 | 4.07 | 4.09 | 4.04 | 4.25 | 4.01 | 4.33 |
| | tan δ | Primary target: ≤0.120, Secondary target: ≤0.100 | 0.097 | 0.094 | 0.089 | 0.091 | 0.092 | 0.117 | 0.115 |
| | EB % | Target: >450 | 570 | 575 | 575 | 515 | 495 | 600 | 585 |
| | (1) tan δ index | Primary target: ≥105, Secondary target: ≥110 | 129 | 133 | 140 | 137 | 136 | 107 | 109 |
| | (2) EB index | Target: ≥80 | 101 | 102 | 102 | 91 | 88 | 106 | 104 |
| | (3) Abrasion resistance index | Target: ≥90 | 102 | 102 | 102 | 92 | 92 | 114 | 127 |
| | Average of three indexes (1)-(3) | Primary target: >103, Secondary target: >105 | 111 | 112 | 115 | 107 | 105 | 109 | 113 |
| | Processability index | Target: ≥90 | 97 | 95 | 90 | 100 | 95 | 92 | 96 |

| | Rubber composition for sidewall | Example | | | | | | |
|---|---|---|---|---|---|---|---|---|
| | | 35 | 36 | 37 | 38 | 39 | 40 | 41 |
| Formulation (part by mass) | NR | 60 | 60 | 60 | 60 | 60 | 70 | 20 |
| | IR | — | — | — | — | — | — | 20 |
| | BR1(CB25) | 40 | 40 | 40 | 40 | 40 | 30 | 60 |
| | BR2(CB22) | — | — | — | — | — | — | — |

TABLE 3-continued

|  |  |  |  |  |  |  |  |  |
|---|---|---|---|---|---|---|---|---|
| BR3(BR150B) |  | — | — | — | — | — | — | — |
| BR4(VCR617) |  | — | — | — | — | — | — | — |
| BR5(BR1250H) |  | — | — | — | — | — | — | — |
| SBR(HPR340) |  | — | — | — | — | — | — | — |
| Compound I |  | 1 | 1 | 1 | 1 | 1 | 1 | 1 |
| S-(3-aminopropyl)thiosulfrric acid |  | — | — | — | — | — | — | — |
| Carbon black 1(N550) |  | — | 30 | 30 | 30 | 30 | 30 | 30 |
| Carbon black 2(N660) |  | — | — | — | — | — | — | — |
| Carbon black 3(N330) |  | — | — | — | — | — | — | — |
| Carbon black 4(N762) |  | 45 | — | — | — | — | — | — |
| Carbon black 5(N220) |  | — | — | — | — | — | — | — |
| Silica |  | 10 | 10 | 10 | 10 | 10 | 10 | 10 |
| Silane coupling agent |  | — | — | — | — | — | — | — |
| C5 petroleum resin |  | 2 | 2 | 2 | 2 | 2 | 2 | 2 |
| TDAE oil |  | 2 | 2 | 2 | 2 | 2 | 2 | 2 |
| Wax |  | 1.5 | 1.5 | 1.5 | 1.5 | 1.5 | 1.5 | 1.5 |
| Antioxidant 6PPD |  | 3 | 3 | 3 | 3 | 3 | 3 | 3 |
| Antioxidant TMQ |  | 1 | 1 | 1 | 1 | 1 | 1 | 1 |
| Stearic acid |  | 2 | 2 | 2 | 2 | 2 | 2 | 2 |
| Zinc oxide |  | 4 | 4 | 4 | 4 | 4 | 4 | 4 |
| 5% Oil-containing powder sulfur |  | 2.1 | 1.7 | 1.5 | 1.0 | 2.3 | 2.1 | 2.1 |
| Net sulfur content |  | 2.0 | 1.6 | 1.4 | 1.0 | 2.2 | 2.0 | 2.0 |
| Vulcanization accelerator TBBS |  | 0.8 | 1.2 | 2 | 2 | 0.6 | 0.8 | 0.8 |
| HTS |  | — | — | — | 1.5 | — | — | — |
| Net sulfur content |  | — | — | — | 0.5 | — | — | — |
| (Compound I content/Carbon black content) × 100 |  | 2.22 | 3.33 | 3.33 | 3.33 | 3.33 | 3.33 | 3.33 |
| Performance E* | Target: 3.5-4.5 | 3.85 | 4.11 | 4.22 | 4.18 | 4.11 | 3.94 | 4.22 |
| tan δ | Primary target: ≤0.120, Secondary target: ≤0.100 | 0.089 | 0.091 | 0.089 | 0.086 | 0.099 | 0.089 | 0.115 |
| EB % | Target: >450 | 460 | 525 | 485 | 525 | 540 | 605 | 545 |
| (1) tan δ index | Primary target: ≥105, Secondary target: ≥110 | 140 | 137 | 140 | 145 | 126 | 140 | 109 |
| (2) EB index | Target: ≥80 | 81 | 93 | 86 | 93 | 96 | 107 | 96 |
| (3) Abrasion resistance index | Target: ≥90 | 90 | 100 | 94 | 100 | 98 | 90 | 110 |
| Average of three indexes (1)-(3) | Primary target: >103, Secondary target: >105 | 104 | 110 | 107 | 113 | 107 | 113 | 105 |
| Processability index | Target: ≥90 | 105 | 100 | 100 | 101 | 100 | 102 | 92 |

|  |  |  | Example |  |  |  |  |  |  |
|---|---|---|---|---|---|---|---|---|---|
| Rubber composition for sidewall |  |  | 42 | 43 | 44 | 45 | 46 | 47 | 48 |
| Formulation (part by mass) | NR |  | 60 | 60 | 60 | 40 | 60 | 40 | 60 |
|  | IR |  | — | — | — | 20 | — | 20 | — |
|  | BR1(CB25) |  | — | — | — | — | — | — | 30 |
|  | BR2(CB22) |  | — | — | 30 | — | — | — | — |
|  | BR3(BR150B) |  | 40 | — | — | — | — | — | — |
|  | BR4(VCR617) |  | — | 40 | 10 | — | 20 | — | — |
|  | BR5(BR1250H) |  | — | — | — | 40 | 20 | — | — |
|  | SBR(HPR340) |  | — | — | — | — | — | 40 | 10 |
|  | Compound I |  | 1 | 1 | 1 | 1 | 1 | 1 | 1 |
|  | S-(3-aminopropyl)thiosulfrric acid |  | — | — | — | — | — | — | — |
|  | Carbon black 1(N550) |  | 30 | 30 | 30 | 30 | 30 | 30 | 30 |
|  | Carbon black 2(N660) |  | — | — | — | — | — | — | — |
|  | Carbon black 3(N330) |  | — | — | — | — | — | — | — |
|  | Carbon black 4(N762) |  | — | — | — | — | — | — | — |
|  | Carbon black 5(N220) |  | — | — | — | — | — | — | — |
|  | Silica |  | 10 | 10 | 10 | 10 | 10 | 10 | 10 |
|  | Silane coupling agent |  | — | — | — | — | — | — | — |
|  | C5 petroleum resin |  | 2 | 2 | 2 | 2 | 2 | 2 | 2 |
|  | TDAE oil |  | 2 | 2 | 2 | 2 | 2 | 2 | 2 |
|  | Wax |  | 1.5 | 1.5 | 1.5 | 1.5 | 1.5 | 1.5 | 1.5 |
|  | Antioxidant 6PPD |  | 3 | 3 | 3 | 3 | 3 | 3 | 3 |
|  | Antioxidant TMQ |  | 1 | 1 | 1 | 1 | 1 | 1 | 1 |
|  | Stearic acid |  | 2 | 2 | 2 | 2 | 2 | 2 | 2 |
|  | Zinc oxide |  | 4 | 4 | 4 | 4 | 4 | 4 | 4 |
|  | 5% Oil-containing powder sulfur |  | 2.1 | 2.1 | 2.1 | 2.1 | 2.1 | 2.1 | 2.1 |
|  | Net sulfur content |  | 2.0 | 2.0 | 2.0 | 2.0 | 2.0 | 2.0 | 2.0 |
|  | Vulcanization accelerator TBBS |  | 0.8 | 0.8 | 0.8 | 0.8 | 0.8 | 0.8 | 0.8 |
|  | HTS |  | — | — | — | — | — | — | — |
|  | Net sulfur content |  | — | — | — | — | — | — | — |
| (Compound I content/Carbon black content) × 100 |  |  | 3.33 | 3.33 | 3.33 | 3.33 | 3.33 | 3.33 | 3.33 |
| Performance | E* | Target: 3.5-4.5 | 3.88 | 4.38 | 4.21 | 3.65 | 4.11 | 4.35 | 4.45 |
|  | tan δ | Primary target: ≤0.120, Secondary target: ≤0.100 | 0.104 | 0.101 | 0.099 | 0.088 | 0.092 | 0.098 | 0.096 |
|  | EB % | Target: >450 | 540 | 515 | 550 | 505 | 525 | 560 | 525 |
|  | (1) tan δ index | Primary target: ≥105, Secondary target: ≥110 | 120 | 124 | 126 | 142 | 136 | 128 | 130 |
|  | (2) EB index | Target: ≥80 | 96 | 91 | 97 | 89 | 93 | 99 | 93 |
|  | (3) Abrasion resistance index | Target: ≥90 | 95 | 111 | 107 | 92 | 106 | 105 | 100 |

TABLE 3-continued

|  |  | | | | | | | |
|---|---|---|---|---|---|---|---|---|
| Average of three indexes (1)-(3) | Primary target: >103, Secondary target: >105 | 104 | 109 | 110 | 108 | 112 | 111 | 108 |
| Processability index | Target: ≥90 | 104 | 110 | 102 | 90 | 102 | 90 | 95 |

TABLE 4

| | | | Comparative Example | | | | | |
|---|---|---|---|---|---|---|---|---|
| Rubber composition for sidewall | | | 14 | 15 | 16 | 17 | 18 | 19 |
| Formulation (part by mass) | NR | | 60 | 60 | 40 | 60 | 60 | 60 |
| | IR | | — | — | 20 | — | — | — |
| | BR1(CB25) | | 40 | 40 | 40 | 40 | 40 | 40 |
| | BR2(CB22) | | — | — | — | — | — | — |
| | BR3(BR150B) | | — | — | — | — | — | — |
| | BR4(VCR617) | | — | — | — | — | — | — |
| | BR5(BR1250H) | | — | — | — | — | — | — |
| | SBR(HPR340) | | — | — | — | — | — | — |
| | Compound I | | — | 0.02 | 7 | 1 | 2 | 2 |
| | S-(3-aminopropyl)thiosulfuric acid | | — | — | — | — | — | — |
| | Carbon black 1(N550) | | 30 | 30 | 30 | 10 | — | — |
| | Carbon black 2(N660) | | — | — | — | — | 60 | — |
| | Carbon black 3(N330) | | — | — | — | — | — | — |
| | Carbon black 4(N762) | | — | — | — | — | — | 60 |
| | Carbon black 5(N220) | | — | — | — | 24 | — | — |
| | Silica | | 10 | 10 | 10 | — | 10 | 10 |
| | Silane coupling agent | | — | — | — | — | — | — |
| | C5 petroleum resin | | 2 | 2 | 2 | 2 | 2 | 2 |
| | TDAE oil | | 2 | 2 | 2 | 2 | 8 | 8 |
| | Wax | | 1.5 | 1.5 | 1.5 | 1.5 | 1.5 | 1.5 |
| | Antioxidant 6PPD | | 3 | 3 | 3 | 3 | 3 | 3 |
| | Antioxidant TMQ | | 1 | 1 | 1 | 1 | 1 | 1 |
| | Stearic acid | | 2 | 2 | 2 | 2 | 2 | 2 |
| | Zinc oxide | | 4 | 4 | 4 | 4 | 4 | 4 |
| | 5% Oil-containing powder sulfur | | 2.1 | 2.1 | 2.1 | 2.1 | 2.1 | 2.1 |
| | Net sulfur content | | 2.0 | 2.0 | 2.0 | 2.0 | 2.0 | 2.0 |
| | Vulcanization accelerator TBBS | | 0.8 | 0.8 | 0.8 | 0.8 | 0.8 | 0.8 |
| | HTS | | — | — | — | — | — | — |
| | Net sulfur content | | | | | | | |
| (Compound I content/Carbon black content) × 100 | | | — | 0.06 | 23.33 | 2.94 | 3.33 | 3.33 |
| Performance | E* | Target: 3.5-4.5 | 4.05 | 4.04 | 4.39 | 4.33 | 4.45 | 3.95 |
| | tan δ | Primary target: ≤120, Secondary target: ≤0.100 | 0.125 | 0.121 | 0.081 | 0.117 | 0.110 | 0.091 |
| | EB % | Target: >450 | 565 | 570 | 555 | 445 | 445 | 435 |
| | (1) tan δ index | Primary target: ≥105, Secondary target: ≥110 | 100 | 103 | 154 | 107 | 114 | 137 |
| | (2) EB index | Target: ≥80 | 100 | 101 | 98 | 79 | 79 | 77 |
| | (3) Abrasion resistance index | Target: ≥90 | 100 | 100 | 105 | 126 | 85 | 102 |
| | Average of three indexes (1)-(3) | Primary target: >103, Secondary target: >105 | 100 | 101 | 119 | 104 | 92 | 65 |
| | Processability index | Target: ≥90 | 100 | 100 | 70 | 85 | 75 | 95 |

| | | Comparative Example | | | | | |
|---|---|---|---|---|---|---|---|
| Rubber composition for sidewall | | 20 | 21 | 22 | 23 | 24 | 25 |
| Formulation (part by mass) | NR | 60 | 5 | 80 | 60 | 60 | 60 |
| | IR | — | 20 | — | — | — | — |
| | BR1(CB25) | 40 | 75 | 20 | 40 | — | 40 |
| | BR2(CB22) | — | — | — | — | — | — |
| | BR3(BR150B) | — | — | — | — | — | — |
| | BR4(VCR617) | — | — | — | — | 20 | — |
| | BR5(BR1250H) | — | — | — | — | 20 | — |
| | SBR(HPR340) | — | — | — | — | — | — |
| | Compound I | 1 | 1 | 1 | 1 | — | — |
| | S-(3-aminopropyl)thiosulfuric acid | — | — | — | — | — | 1 |
| | Carbon black 1(N550) | 30 | 30 | 30 | 30 | 30 | 30 |
| | Carbon black 2(N660) | — | — | — | — | — | — |
| | Carbon black 3(N330) | — | — | — | — | — | — |
| | Carbon black 4(N762) | — | — | — | — | — | — |
| | Carbon black 5(N220) | — | — | — | — | — | — |
| | Silica | 10 | 10 | 10 | 10 | 10 | 10 |
| | Silane coupling agent | — | — | — | — | — | — |
| | C5 petroleum resin | 2 | 2 | 2 | 2 | 2 | 2 |
| | TDAE oil | 2 | 2 | 2 | 2 | 2 | 2 |
| | Wax | 1.5 | 1.5 | 1.5 | 1.5 | 1.5 | 1.5 |
| | Antioxidant 6PPD | 3 | 3 | 3 | 3 | 3 | 3 |

TABLE 4-continued

| | | | | | | | |
|---|---|---|---|---|---|---|---|
| Antioxidant TMQ | | 1 | 1 | 1 | 1 | 1 | 1 |
| Stearic acid | | 2 | 2 | 2 | 2 | 2 | 2 |
| Zinc oxide | | 4 | 4 | 4 | 4 | 4 | 4 |
| 5% Oil-containing powder sulfur | | 2.5 | 2.1 | 2.1 | 0.7 | 2.1 | 2.1 |
| Net sulfur content | | 2.4 | 2.0 | 2.0 | 0.7 | 2.0 | 2.0 |
| Vulcanization accelerator TBBS | | 0.5 | 0.8 | 0.8 | 3.5 | 0.8 | 0.8 |
| HTS | | — | — | — | — | — | — |
| Net sulfur content | | | | | | | |
| (Compound I content/Carbon black content) × 100 | | 3.33 | 3.33 | 3.33 | 3.33 | — | — |
| Performance E* | Target: 3.5-4.5 | 4.45 | 4.45 | 3.59 | 3.65 | 4.09 | 4.22 |
| tan δ | Primary target: ≤120, Secondary target: ≤0.100 | 0.105 | 0.121 | 0.091 | 0.086 | 0.115 | 0.094 |
| EB % | Target: >450 | 525 | 425 | 635 | 435 | 525 | 440 |
| (1) tan δ index | Primary target: ≥105, Secondary target: ≥110 | 119 | 103 | 137 | 145 | 109 | 133 |
| (2) EB index | Target: ≥80 | 93 | 75 | 112 | 77 | 93 | 78 |
| (3) Abrasion resistance index | Target: ≥90 | 88 | 120 | 64 | 104 | 106 | 60 |
| Average of three indexes (1)-(3) | Primary target: >103, Secondary target: >105 | 100 | 100 | 105 | 109 | 103 | 90 |
| Processability index | Target: ≥90 | 100 | 92 | 101 | 95 | 104 | 80 |

Tables 3 and 4 show that, in the examples using predetermined amounts of an isoprene-based rubber, a butadiene rubber, a specific carbon black, sulfur, and a compound represented by the formula (I), the fuel efficiency, abrasion resistance, elongation at break, and processability were improved in a balanced manner. The handling stability was also favorable.

The invention claimed is:

1. A pneumatic tire, comprising a tread formed from a rubber composition comprising:
a rubber component;
a carbon black having a nitrogen adsorption specific surface area of 80 to 250 m²/g;
sulfur; and
a compound represented by formula (I),

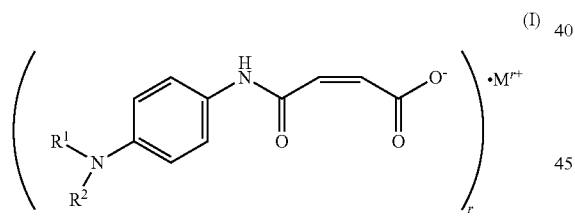

the rubber component comprising, based on 100 mass % of the rubber component, 35 to 95 mass % of an isoprene-based rubber and 5 to 65 mass % of a high-cis butadiene rubber having a cis content of 90 mass % or more,
an amount of the carbon black being 20 to 70 parts by mass per 100 parts by mass of the rubber component,
an amount of the sulfur being 0.5 to 1.6 parts by mass per 100 parts by mass of the rubber component,
an amount of the compound represented by the formula (I) being 0.1 to 20 parts by mass per 100 parts by mass of the carbon black,
wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

2. The pneumatic tire according to claim 1, wherein the compound represented by the formula (I) is a compound represented by formula (I-1), (I-2), or (I-3):

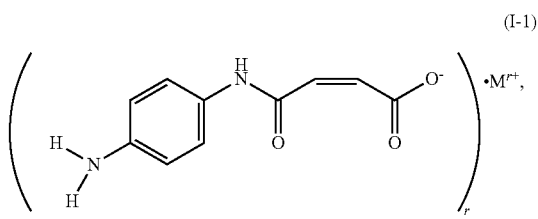

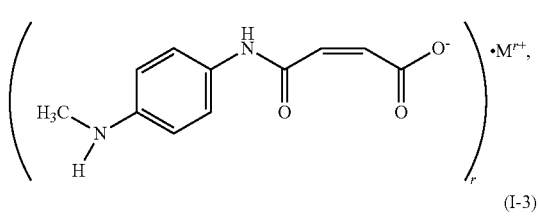

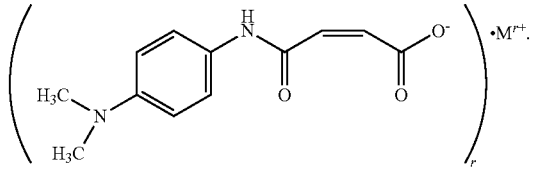

3. The pneumatic tire according to claim 1, wherein the metal ion is a sodium ion, a potassium ion, or a lithium ion.

4. The pneumatic tire according to claim 1, wherein the high-cis butadiene rubber is a rare earth butadiene rubber synthesized in the presence of a rare earth catalyst and having a vinyl content of 1.0 mass % or less and a cis content of 95 mass % or more, and the amount of the compound represented by the formula (I) is 0.5 to 5 parts by mass per 100 parts by mass of the carbon black.

5. The pneumatic tire according to claim 1, wherein the rubber composition has a combined amount of stearic acid, calcium stearate, and a fatty acid zinc salt of 3.5 to 6 parts by mass per 100 parts by mass of the rubber component.

6. The pneumatic tire according to claim 1, wherein the rubber composition has an amount of oil of 0 to 7 parts by mass, and an amount of zinc oxide of 1.5 to 3.99 parts by mass, each per 100 parts by mass of the rubber component.

7. The pneumatic tire according to claim 1, wherein the rubber composition comprises a masterbatch obtained by kneading the isoprene-based rubber, the carbon black, and the compound represented by the formula (I), wherein the masterbatch comprises: 10 to 50 parts by mass of the carbon black per 100 parts by mass of the isoprene-based rubber, and 0.5 to 5 parts by mass of the compound represented by the formula (I) per 100 parts by mass of the carbon black.

8. A pneumatic tire, comprising at least one of a sidewall, a wing, a base tread, a sidewall packing, a breaker cushion, and a tie gum, each of which is formed from a rubber composition comprising:
a rubber component;
a carbon black having a nitrogen adsorption specific surface area of 20 to 90 m²/g;
sulfur; and
a compound represented by formula (I),

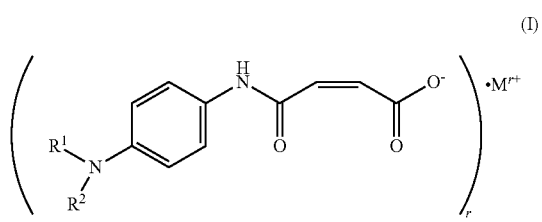

(I)

the rubber component comprising, based on 100 mass % of the rubber component, 40 to 75 mass % of an isoprene-based rubber and 25 to 60 mass % of a butadiene rubber,
an amount of the carbon black being 15 to 55 parts by mass per 100 parts by mass of the rubber component,
an amount of the sulfur being 1.0 to 2.3 parts by mass per 100 parts by mass of the rubber component,
an amount of the compound represented by the formula (I) being 0.1 to 20 parts by mass per 100 parts by mass of the carbon black,
wherein $R^1$ and $R^2$ are the same as or different from each other, and each represent a hydrogen atom, a C1-C20 alkyl group, a C1-C20 alkenyl group, or a C1-C20 alkynyl group; $M^{r+}$ represents a metal ion; and r represents a valence of the metal ion.

9. The pneumatic tire according to claim 8, wherein the compound represented by the formula (I) is a compound represented by formula (I-1), (I-2), or (I-3):

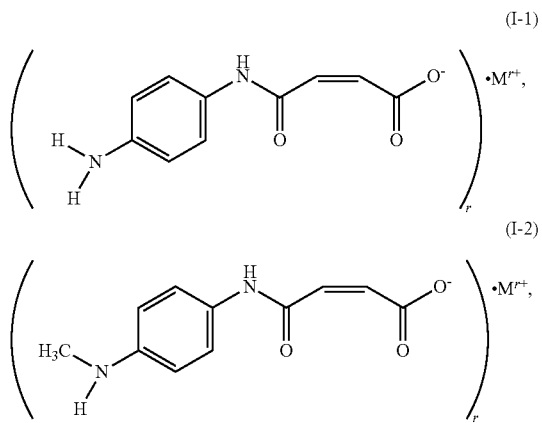

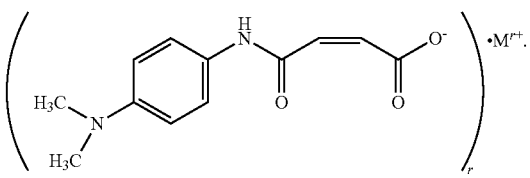

(I-3)

10. The pneumatic tire according to claim 8, wherein the metal ion is a sodium ion, a potassium ion, or a lithium ion.

11. The pneumatic tire according to claim 8, wherein the amount of the compound represented by the formula (I) is 0.5 to 5 parts by mass per 100 parts by mass of the carbon black.

12. The pneumatic tire according to claim 8, wherein the nitrogen adsorption specific surface area of the carbon black is 20 to 70 m²/g, and the amount of the carbon black is 15 to 50 parts by mass per 100 parts by mass of the rubber component.

13. The pneumatic tire according to claim 8, wherein the butadiene rubber is at least one selected from the group consisting of a syndiotactic crystal-containing butadiene rubber, a rare earth butadiene rubber synthesized in the presence of a rare earth catalyst, and a tin-modified butadiene rubber, and a combined amount of the syndiotactic crystal-containing butadiene rubber, the rare earth butadiene rubber, and the tin-modified butadiene rubber is 10 to 60 mass % based on 100 mass % of the rubber component.

14. The pneumatic tire according to claim 2, wherein the metal ion is a sodium ion, a potassium ion, or a lithium ion.

15. The pneumatic tire according to claim 2, wherein the high-cis butadiene rubber is a rare earth butadiene rubber synthesized in the presence of a rare earth catalyst and having a vinyl content of 1.0 mass % or less and a cis content of 95 mass % or more, and the amount of the compound represented by the formula (I) is 0.5 to 5 parts by mass per 100 parts by mass of the carbon black.

16. The pneumatic tire according to claim 2, wherein the rubber composition has a combined amount of stearic acid, calcium stearate, and a fatty acid zinc salt of 3.5 to 6 parts by mass per 100 parts by mass of the rubber component.

17. The pneumatic tire according to claim 2, wherein the rubber composition has an amount of oil of 0 to 7 parts by mass, and an amount of zinc oxide of 1.5 to 3.99 parts by mass, each per 100 parts by mass of the rubber component.

18. The pneumatic tire according to claim 9, wherein the metal ion is a sodium ion, a potassium ion, or a lithium ion.

19. The pneumatic tire according to claim 9, wherein the amount of the compound represented by the formula (I) is 0.5 to 5 parts by mass per 100 parts by mass of the carbon black.

20. The pneumatic tire according to claim 9, wherein the nitrogen adsorption specific surface area of the carbon black is 20 to 70 m²/g, and the amount of the carbon black is 15 to 50 parts by mass per 100 parts by mass of the rubber component.

* * * * *